US012030313B2

(12) United States Patent
Amano et al.

(10) Patent No.: US 12,030,313 B2

(45) Date of Patent: Jul. 9, 2024

(54) LIQUID DISCHARGE APPARATUS

(71) Applicant: SEIKO EPSON CORPORATION, Tokyo (JP)

(72) Inventors: Atsushi Amano, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 443 days.

(21) Appl. No.: 17/646,008

(22) Filed: Dec. 27, 2021

(65) Prior Publication Data

US 2022/0203677 A1 Jun. 30, 2022

(30) Foreign Application Priority Data

Dec. 29, 2020 (JP) ................................ 2020-219835

(51) Int. Cl.
*B41J 2/045* (2006.01)

(52) U.S. Cl.
CPC ....... *B41J 2/04541* (2013.01); *B41J 2/04581* (2013.01)

(58) Field of Classification Search
CPC . B41J 2/04541; B41J 2/04581; B41J 2/04558
See application file for complete search history.

(56) References Cited

U.S. PATENT DOCUMENTS

| | | | | |
|---|---|---|---|---|
| 11,148,416 | B2 * | 10/2021 | Kashimura .......... | B41J 2/04541 |
| 2015/0062213 | A1 | 3/2015 | Kashimura et al. | |
| 2017/0100929 | A1 * | 4/2017 | Nozawa ............... | B41J 2/04541 |
| 2018/0170038 | A1 * | 6/2018 | Matsumoto .......... | B41J 2/04588 |
| 2018/0272696 | A1 * | 9/2018 | Ito ........................ | B41J 2/04581 |

FOREIGN PATENT DOCUMENTS

| | | |
|---|---|---|
| JP | 2015-047704 A | 3/2015 |

* cited by examiner

*Primary Examiner* — Lam S Nguyen
(74) *Attorney, Agent, or Firm* — Global IP Counselors, LLP

(57) ABSTRACT

There is provided a liquid discharge apparatus, in which a first inductance element included in a first demodulation circuit has a first terminal which a first amplified modulated signal is input, a second terminal which a first driving signal is output, a second inductance element included in a second demodulation circuit has a third terminal which is provided in a fourth side portion, and to which a second amplified modulated signal is input, a fourth terminal which is provided in a fifth side portion that faces the fourth side portion, and from which a second driving signal is output, and a second lead member coupled to the third terminal and the fourth terminal and having a third refraction point and a fourth refraction point, and the first inductance element and the second inductance element are positioned such that the second side portion and the fourth side portion face each other.

5 Claims, 12 Drawing Sheets

| [SIH, SIL] | | [1, 1] (LD) | [1, 0] (MD) | [0, 1] (SD) | [0, 0] (ND) |
|---|---|---|---|---|---|
| S1 | T1 | H | H | H | L |
| | T2 | H | L | L | L |
| S2 | T1 | L | L | L | H |
| | T2 | L | H | L | L |

LIQUID DISCHARGE APPARATUS

The present application is based on, and claims priority from JP Application Serial Number 2020-219835, filed Dec. 29, 2020, the disclosure of which is hereby incorporated by reference herein in its entirety.

BACKGROUND

1. Technical Field

The present disclosure relates to a liquid discharge apparatus.

2. Related Art

As an ink jet printer that prints an image or a document on a medium by discharging ink as a liquid, for example, the one using a piezoelectric element such as a piezoelectric device is known. Piezoelectric elements are provided in a head unit corresponding to each of the plurality of nozzles. In addition, each of the piezoelectric elements operates according to the driving signal, and accordingly, a predetermined amount of ink is discharged from the corresponding nozzle at a predetermined timing. Accordingly, dots are formed on the medium. Such a piezoelectric element is a capacitive load, such as a capacitor, from an electrical point of view. Therefore, it is necessary to supply a sufficient current to operate the piezoelectric element that corresponds to each of the nozzles, and an ink jet printer or the like includes a driving signal output circuit having, for example, an amplifier circuit that outputs a driving signal capable of supplying a sufficient current to operate the piezoelectric element.

For example, JP-A-2015-047704 discloses a liquid discharge apparatus including a driving signal output circuit (driving signal generation section) using a class D amplifier circuit capable of reducing power consumption, that is, a driving signal output circuit using an inductance element including Mn—Zn-based ferrite in a smoothing circuit that outputs a driving signal.

However, in response to the recent market demand for improved printing speed and miniaturization of the liquid discharge apparatus, the number of discharge sections for discharging the liquid is increasing, and as a result, the amount of current output by the driving signal output circuit is increasing dramatically. There is a concern that an increase in the amount of current causes a problem such as magnetic saturation in the inductance element of the smoothing circuit that outputs the driving signal, and there is a concern that the driving signal output circuit is affected by the influence of the magnetic field generated by the inductance element. As a result, there is a concern that distortion occurs in the waveform of the driving signal output by the driving signal output circuit, and the ink discharge characteristics of the liquid discharge apparatus deteriorates. With respect to such a problem, the liquid discharge apparatus including the driving signal output circuit described in JP-A-2015-047704 is not sufficient, and there is room for further improvement.

SUMMARY

According to an aspect of the present disclosure, there is provided a liquid discharge apparatus including: a first discharge section that discharges a liquid by supplying a first driving signal; a first integrated circuit that outputs a first modulated signal obtained by modulating a first reference driving signal that is a reference of the first driving signal; a first amplifier circuit that outputs a first amplified modulated signal by driving a first transistor driven by the first modulated signal; a first demodulation circuit that includes a first inductance element and outputs the first driving signal obtained by demodulating the first amplified modulated signal; a second discharge section that discharges the liquid by supplying a second driving signal; a second integrated circuit that outputs a second modulated signal obtained by modulating a second reference driving signal that is a reference of the second driving signal; a second amplifier circuit that outputs a second amplified modulated signal by driving a second transistor driven by the second modulated signal; and a second demodulation circuit that includes a second inductance element and outputs the second driving signal obtained by demodulating the second amplified modulated signal, in which the first inductance element includes a first housing having a first side portion, a second side portion positioned facing the first side portion, and a third side portion intersecting with the first side portion and the second side portion, a first terminal which is provided in the first side portion, and to which the first amplified modulated signal is input, a second terminal which is provided in the second side portion, and from which the first driving signal is output, a first lead member of which one end is coupled to the first terminal and the other end is coupled to the second terminal, and which has a first refraction point and a second refraction point and is provided inside the first housing, and a first guide member provided so as to surround at least a part of the first lead member, in a direction intersecting with a direction from the first side portion toward the second side portion, at least a part of the first lead section positioned between the first refraction point and the second refraction point in the first lead member and a first virtual straight line that connects the first terminal and the second terminal intersect with each other at a first center portion where distances to the first terminal and the second terminal on the first virtual straight line are equal to each other, the second inductance element includes a second housing having a fourth side portion, a fifth side portion positioned facing the fourth side portion, and a sixth side portion intersecting with the fourth side portion and the fifth side portion, a third terminal which is provided in the fourth side portion, and to which the second amplified modulated signal is input, a fourth terminal which is provided in the fifth side portion, and from which the second driving signal is output, a second lead member of which one end is coupled to the third terminal and the other end is coupled to the fourth terminal, and which has a third refraction point and a fourth refraction point and is provided inside the second housing, and a second guide member provided so as to surround at least a part of the second lead member, in a direction intersecting with a direction from the fourth side portion toward the fifth side portion, at least a part of the second lead section positioned between the third refraction point and the fourth refraction point in the second lead member and a second virtual straight line that connects the third terminal and the fourth terminal intersect with each other at a second center portion where distances to the first terminal and the second terminal on the second virtual straight line are equal to each other, and the first inductance element and the second inductance element are positioned such that the second side portion and the fourth side portion face each other.

DESCRIPTION OF EXEMPLARY EMBODIMENTS

Figure 1:
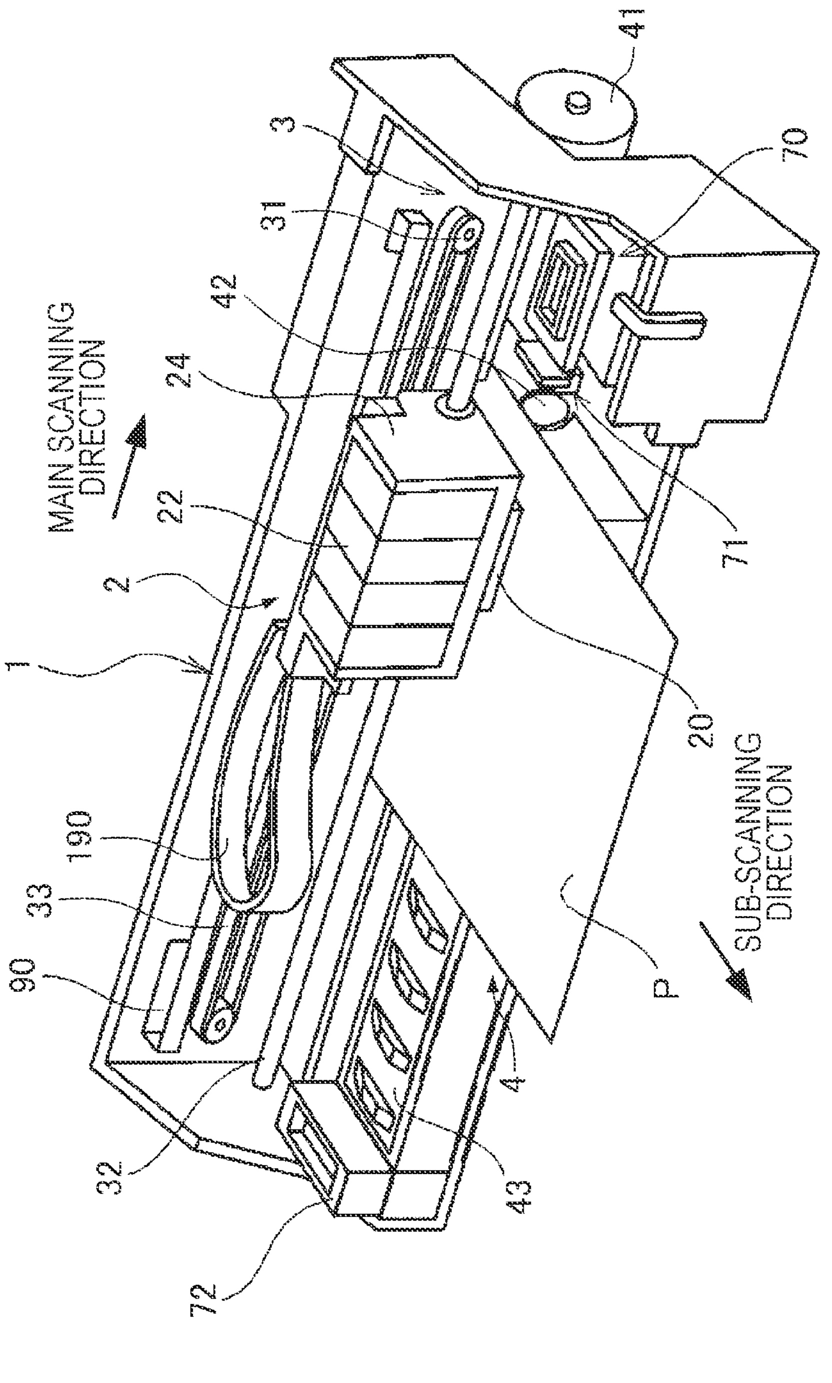
FIG. 1 is a view illustrating a schematic configuration of the inside of a liquid discharge apparatus.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. Not all of the configurations which will be described below are necessarily essential components of the present disclosure.

1. Configuration of Liquid Discharge Apparatus

FIG. 1 is a view illustrating a schematic configuration of the inside of a liquid discharge apparatus 1 according to the present embodiment. The liquid discharge apparatus 1 is an ink jet printer that forms dots on a medium P such as paper by discharging ink as an example of a liquid corresponding to image data supplied from a host computer provided externally, and accordingly prints an image that corresponds to the supplied image data. In addition, in FIG. 1, a part of the configuration of the liquid discharge apparatus 1 such as the housing and the cover is not illustrated.

As illustrated in FIG. 1, the liquid discharge apparatus 1 includes a moving mechanism 3 that moves a head unit 2 in a main scanning direction. The moving mechanism 3 includes a carriage motor 31 as a driving source of the head unit 2, a carriage guide shaft 32 of which both ends are fixed, and a timing belt 33 which extends substantially parallel to the carriage guide shaft 32 and is driven by the carriage motor 31. Further, the moving mechanism 3 includes a linear encoder 90 for detecting the position of the head unit 2 in the main scanning direction.

A carriage 24 of the head unit 2 is configured such that a predetermined number of ink cartridges 22 can be placed. The carriage 24 is supported to be freely reciprocable by the carriage guide shaft 32 and fixed to a part of the timing belt 33. Therefore, by causing the timing belt 33 to travel in the forward and reverse directions by the carriage motor 31, the carriage 24 of the head unit 2 is guided by the carriage guide shaft 32 and reciprocates. In other words, the carriage motor 31 moves the carriage 24 in the main scanning direction. A print head 20 is attached to a part of the carriage 24 facing the medium P. As will be described later, the print head 20 has a large number of nozzles, and discharges a predetermined amount of ink from each nozzle at a predetermined timing. Various control signals are supplied to the head unit 2 that operates as described above via a cable 190 such as a flexible flat cable.

The liquid discharge apparatus 1 includes a transport mechanism 4 for transporting the medium P in a sub-scanning direction. The transport mechanism 4 includes a platen 43 that supports the medium P, a transport motor 41 that is a driving source, and a transport roller 42 that transports the medium P in the sub-scanning direction by being rotated by the transport motor 41. Then, in a state where the medium P is supported by the platen 43, ink is discharged from the print head 20 to the medium P at the timing when the medium P is transported by the transport mechanism 4, and accordingly, a desired image is formed on a front surface of the medium P.

A home position, which is a reference point of the head unit 2, is set in an end region within the movement range of the carriage 24 included in the head unit 2. At the home position, a capping member 70 that seals a nozzle forming surface of the print head 20 and a wiper member 71 for wiping the nozzle forming surface are arranged. The liquid discharge apparatus 1 forms an image on the front surface of the medium P in both a direction when the carriage 24 moves forward from the home position toward the opposite end portion and a direction when the carriage 24 moves rearward from the opposite end portion toward the home position.

At the end portion of the platen 43 in the main scanning direction, which is an end portion opposite to the home position where the carriage 24 moves, a flushing box 72 for collecting ink discharged from the print head 20 during the flushing operation is disposed. The flushing operation is an operation of forcibly discharging ink from each nozzle regardless of the image data in order to prevent a concern that the nozzle is clogged due to thickening of the ink near the nozzle and an appropriate amount of ink is not discharged due to air bubbles entering the nozzle. The flushing boxes 72 may be provided on both sides of the platen 43 in the main scanning direction.

2. Electrical Configuration of Liquid Discharge Apparatus

Figure 2:
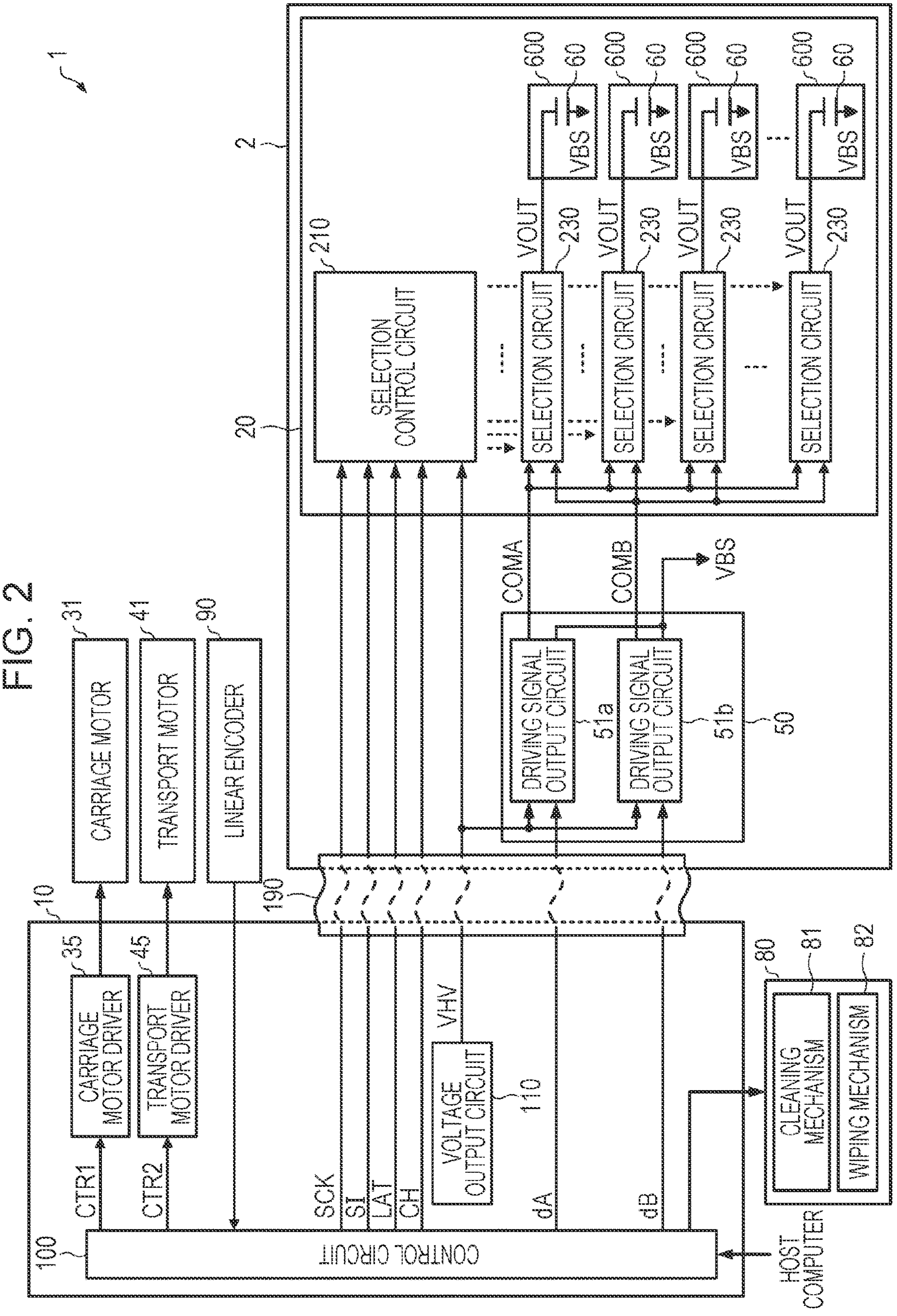
FIG. 2 is a view illustrating an electrical configuration of the liquid discharge apparatus.

FIG. 2 is a view illustrating an electrical configuration of the liquid discharge apparatus 1. As illustrated in FIG. 2, the liquid discharge apparatus 1 has a control unit 10 and the head unit 2. The control unit 10 and the head unit 2 are electrically coupled to each other via the cable 190.

The control unit 10 includes a control circuit 100, a carriage motor driver 35, a transport motor driver 45, and a voltage output circuit 110. The control circuit 100 generates various control signals that correspond to the image data supplied from the host computer and outputs the generated control signals to the corresponding configurations.

Specifically, the control circuit 100 grasps the current scanning position of the head unit 2 based on the detection signal of the linear encoder 90. Then, the control circuit 100 generates control signals CTR1 and CTR2 that correspond to the current scanning position of the head unit 2. The control signal CTR1 is supplied to the carriage motor driver 35. The carriage motor driver 35 drives the carriage motor 31 in accordance with the input control signal CTR1. Further, the control signal CTR2 is supplied to the transport motor driver 45. The transport motor driver 45 drives the transport motor 41 in accordance with the input control signal CTR2. Accordingly, the movement of the carriage 24 in the main scanning direction and the transport of the medium P in the sub-scanning direction are controlled.

The control circuit 100 generates a clock signal SCK, a print data signal SI, a latch signal LAT, a change signal CH, and reference driving signals dA and dB corresponding to the current scanning position of the head unit 2 based on the image data supplied from the host computer provided externally and the detection signal of the linear encoder 90, and outputs the generated signals to the head unit 2.

The control circuit 100 causes a maintenance unit 80 to execute a maintenance process for normally recovering the discharge state of the ink in a discharge section 600. The maintenance unit 80 includes a cleaning mechanism 81 and a wiping mechanism 82. As a maintenance process, the cleaning mechanism 81 performs a pumping process of suctioning thickened ink, air bubbles, and the like stored inside the discharge section 600 by a tube pump (not illustrated). As a maintenance process, the wiping mechanism 82 performs a wiping process of wiping foreign matter such as paper dust adhering close to the nozzle of the discharge section 600 with the wiper member 71. The control circuit 100 may execute the above-described flushing operation as a maintenance process for normally recovering the discharge state of the ink in the discharge section 600.

The voltage output circuit 110 generates, for example, a voltage VHV having a DC voltage of 42 V and outputs the generated voltage VHV to the head unit 2. The voltage VHV is used as a power source voltage or the like of various configurations of the head unit 2. The voltage VHV generated by the voltage output circuit 110 may be used as a power source voltage of various configurations of the control unit 10. Furthermore, the voltage output circuit 110 may generate a plurality of DC voltage signals having voltage values different from that of the voltage VHV and supply the generated DC voltage signals to the respective configurations included in the control unit 10 and the head unit 2.

The head unit 2 has a driving circuit 50 and the print head 20.

The driving circuit 50 includes driving signal output circuits 51*a* and 51*b*. The digital reference driving signal dA and the voltage VHV are input to the driving signal output circuit 51*a*. The driving signal output circuit 51*a* generates a driving signal COMA by converting the input reference driving signal dA in a digital/analog manner and applying class D amplification to the converted analog signal to a voltage value that corresponds to the voltage VHV. Then, the driving signal output circuit 51*a* outputs the generated driving signal COMA to the print head 20. Similarly, the digital reference driving signal dB and the voltage VHV are input to the driving signal output circuit 51*b*. The driving signal output circuit 51*b* generates a driving signal COMB by converting the input reference driving signal dB in a digital/analog manner and applying class D amplification to the converted analog signal to a voltage value that corresponds to the voltage VHV. Then, the driving signal output circuit 51*b* outputs the generated driving signal COMB to the print head 20.

In other words, the reference driving signal dA defines the waveform of the driving signal COMA, and the reference driving signal dB defines the waveform of the driving signal COMB. Therefore, the reference driving signals dA and dB may be any signal that can define the waveforms of the driving signals COMA and COMB, and may be analog signals, for example. The details of the driving signal output circuits 51*a* and 51*b* will be described later. In the description of FIG. 2, the driving circuit 50 was described as being included in the head unit 2, but the driving circuit 50 may be included in the control unit 10. In this case, the driving signals COMA and COMB output from each of the driving signal output circuits 51*a* and 51*b* are supplied to the print head 20 via the cable 190.

The driving circuit 50 generates a constant reference voltage signal VBS at a voltage value of 5.5 V, 6 V, or the like, and supplies the generated reference voltage signal VBS to the print head 20. The reference voltage signal VBS may be a signal having a potential that is a reference for driving the piezoelectric element 60, and may be, for example, a signal having a ground potential.

The print head 20 includes a selection control circuit 210, a plurality of selection circuits 230, and a plurality of discharge sections 600 that correspond to each of the plurality of selection circuits 230. The selection control circuit 210 generates a selection signal for selecting or deselecting the waveforms of the driving signals COMA and COMB based on the clock signal SCK, the print data signal SI, the latch signal LAT, and the change signal CH supplied from the control circuit 100, and outputs the generated selection signal to each of the plurality of selection circuits 230.

The driving signals COMA and COMB and the selection signal output by the selection control circuit 210 are input to each of the selection circuits 230. Then, the selection circuit 230 generates a driving signal VOUT based on the driving signals COMA and COMB by selecting or deselecting the waveforms of the driving signals COMA and COMB based on the input selection signal, and outputs the generated driving signal VOUT to the corresponding discharge section 600.

Each of the discharge sections 600 includes the piezoelectric element 60. The driving signal VOUT output from the corresponding selection circuit 230 is supplied to one end of the piezoelectric element 60. The constant reference voltage signal VBS having a voltage value of, for example, 5.5 V is supplied to the other end of the piezoelectric element 60. Then, the piezoelectric element 60 included in the discharge section 600 is driven corresponding to the potential difference between the driving signal VOUT supplied to one end and the reference voltage signal VBS supplied to the other end. Accordingly, the ink having an amount that corresponds to the driving of the piezoelectric element 60 is discharged from the discharge section 600.

3. Configuration of Discharge Section

Figure 3:
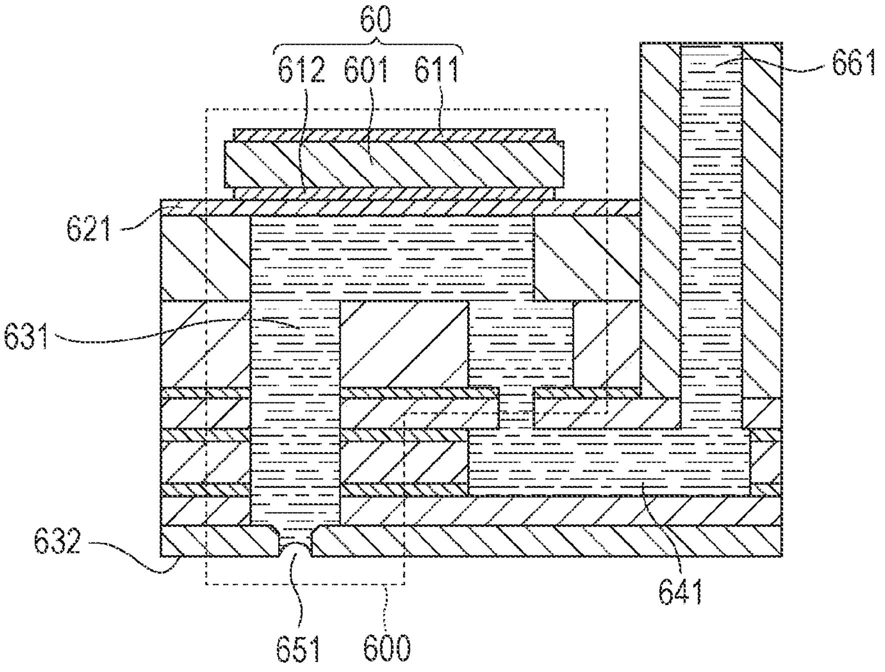
FIG. 3 is a view illustrating a schematic configuration of a discharge section.

Next, the configuration of the discharge section 600 of the print head 20 will be described. FIG. 3 is a view illustrating a schematic configuration of one discharge section 600 among the plurality of discharge sections 600 of the print head 20. As illustrated in FIG. 3, the discharge section 600 includes the piezoelectric element 60, a vibrating plate 621, a cavity 631, and a nozzle 651.

The cavity 631 is filled with ink supplied from a reservoir 641. The ink is introduced into the reservoir 641 from the ink cartridge 22 via an ink tube (not illustrated) and a supply port 661. In other words, the cavity 631 is filled with the ink stored in the corresponding ink cartridge 22.

The vibrating plate 621 is displaced by driving the piezoelectric element 60 provided on the upper surface in FIG. 3.

Then, as the vibrating plate 621 is displaced, the internal volume of the cavity 631 filled with ink expands and contracts. In other words, the vibrating plate 621 functions as a diaphragm that changes the internal volume of the cavity 631.

The nozzle 651 is an opening portion which is provided on a nozzle plate 632 and communicates with the cavity 631. Then, as the internal volume of the cavity 631 changes, the ink having an amount that corresponds to the change in the internal volume is discharged from the nozzle 651.

The piezoelectric element 60 has a structure in which a piezoelectric body 601 is sandwiched between one pair of electrodes 611 and 612. In the piezoelectric body 601 having such a structure, the center part of the electrodes 611 and 612 bends in the up-down direction together with the vibrating plate 621 corresponding to the potential difference of the voltage supplied by the electrodes 611 and 612. Specifically, the driving signal VOUT is supplied to the electrode 611 of the piezoelectric element 60. The reference voltage signal VBS is supplied to the electrode 612 of the piezoelectric element 60. The piezoelectric element 60 bends in the upward direction when the voltage level of the driving signal VOUT increases, and bends in the downward direction when the voltage level of the driving signal VOUT decreases.

In the discharge section 600 configured as described above, the piezoelectric element 60 bends in the upward direction, and accordingly, the vibrating plate 621 is displaced and the internal volume of the cavity 631 expands. As a result, the ink is drawn from the reservoir 641. Meanwhile, the piezoelectric element 60 bends in the downward direction, and accordingly, the vibrating plate 621 is displaced and the internal volume of the cavity 631 contracts. As a result, the ink having an amount that corresponds to the degree of contraction is discharged from the nozzle 651. In other words, the print head 20 includes the electrode 611 and the electrode 612, has the piezoelectric element 60 driven by a potential difference between the electrode 611 and the electrode 612, and discharges the ink by driving the piezoelectric element 60.

Here, the piezoelectric element 60 is not limited to the structure illustrated in FIG. 3, and may be any structure as long as the ink can be discharged from the discharge section 600. Therefore, the piezoelectric element 60 is not limited to the above-described bending vibration configuration, and may be, for example, a configuration using longitudinal vibration.

4. Configuration and Operation of Print Head

Next, the configuration and operation of the print head 20 will be described. As described above, the print head 20 generates the driving signal VOUT by selecting or deselecting the driving signals COMA and COMB output from the driving circuit 50 based on the clock signal SCK, the print data signal SI, the latch signal LAT, and the change signal CH, and supplies the generated driving signal VOUT to the corresponding discharge section 600. Therefore, when describing the configuration and operation of the print head 20, first, an example of waveforms of the driving signals COMA and COMB and an example of a waveform of the driving signal VOUT will be described.

Figure 4:
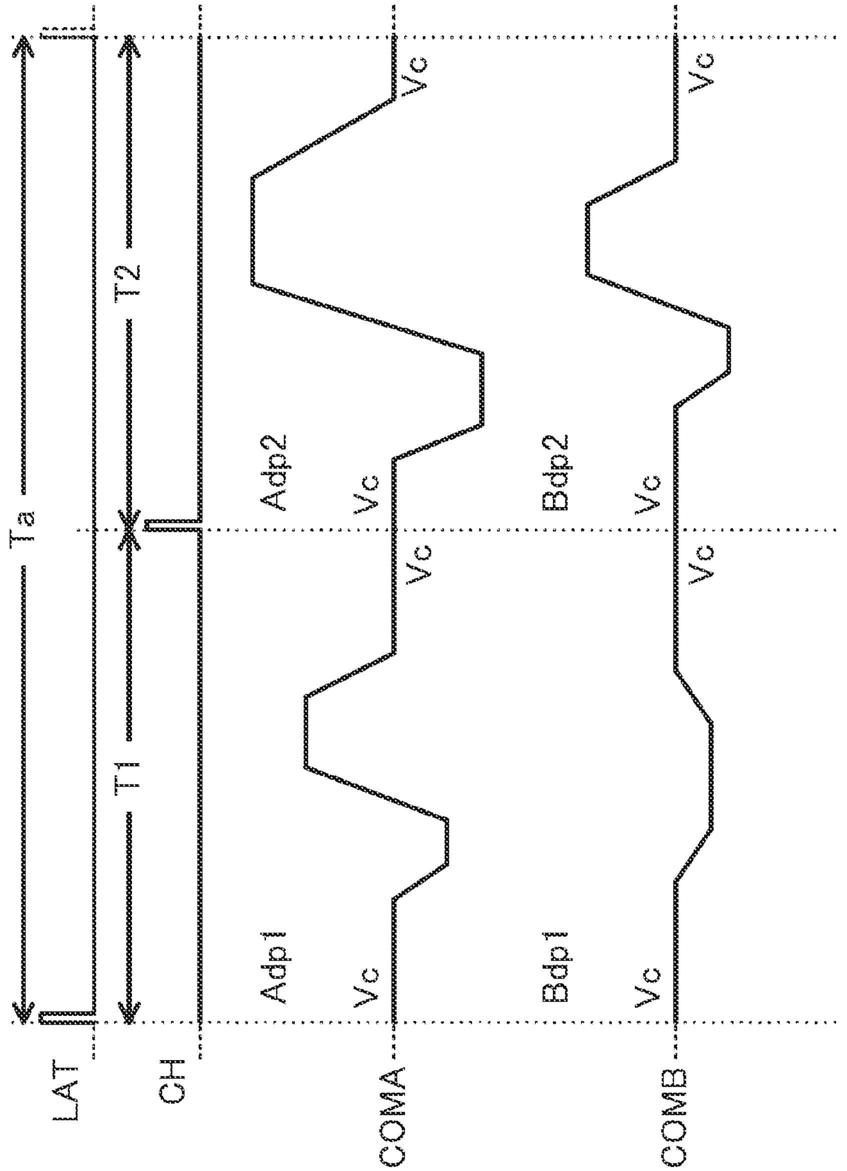
FIG. 4 is a view illustrating an example of waveforms of driving signals.

FIG. 4 is a view illustrating an example of waveforms of the driving signals COMA and COMB. As illustrated in FIG. 4, the driving signal COMA has a waveform in which a trapezoidal waveform Adp1 disposed in a period T1 from the rise of the latch signal LAT to the rise of the change signal CH, and a trapezoidal waveform Adp2 disposed in a period T2 from the rise of the change signal CH to the rise of the latch signal LAT are continuous to each other. The trapezoidal waveform Adp1 is a waveform for discharging a small amount of ink from the nozzle 651, and the trapezoidal waveform Adp2 is a waveform for discharging a medium amount of ink, which is more than a small amount, from the nozzle 651.

In addition, the driving signal COMB has a waveform in which a trapezoidal waveform Bdp1 disposed in the period T1 and a trapezoidal waveform Bdp2 disposed in the period T2 are continuous to each other. The trapezoidal waveform Bdp1 is a waveform that does not discharge the ink from the nozzle 651, and is a waveform for slightly vibrating the ink near the opening portion of the nozzle 651 to prevent an increase in ink viscosity. The trapezoidal waveform Bdp2 is a waveform that discharges a small amount of ink from the nozzle 651, similar to the trapezoidal waveform Adp1.

Both the voltages at the start timing and the end timing of each of the trapezoidal waveforms Adp1, Adp2, Bdp1, and Bdp2 are a voltage Vc which is a common voltage. In other words, each of the trapezoidal waveforms Adp1, Adp2, Bdp1, and Bdp2 is a waveform that starts at the voltage Vc and ends at the voltage Vc. Then, a cycle Ta including the period T1 and the period T2 corresponds to a printing cycle for forming new dots on the medium P.

Here, although FIG. 4 illustrates a case where the trapezoidal waveform Adp1 and the trapezoidal waveform Bdp2 have the same waveform, the trapezoidal waveform Adp1 and the trapezoidal waveform Bdp2 may be different waveforms. It is described that a small amount of ink is discharged from the corresponding nozzles 651 both when the trapezoidal waveform Adp1 is supplied to the discharge section 600 and when the trapezoidal waveform Bdp1 is supplied to the discharge section 600, but different amounts of ink may be discharged. In other words, the waveforms of the driving signals COMA and COMB are not limited to the waveforms illustrated in FIG. 4, but various waveforms may be combined depending on the moving speed of the carriage 24 to which the print head 20 is attached, the properties of the ink stored in the ink cartridge 22, the material of the medium P, and the like.

Figure 5:
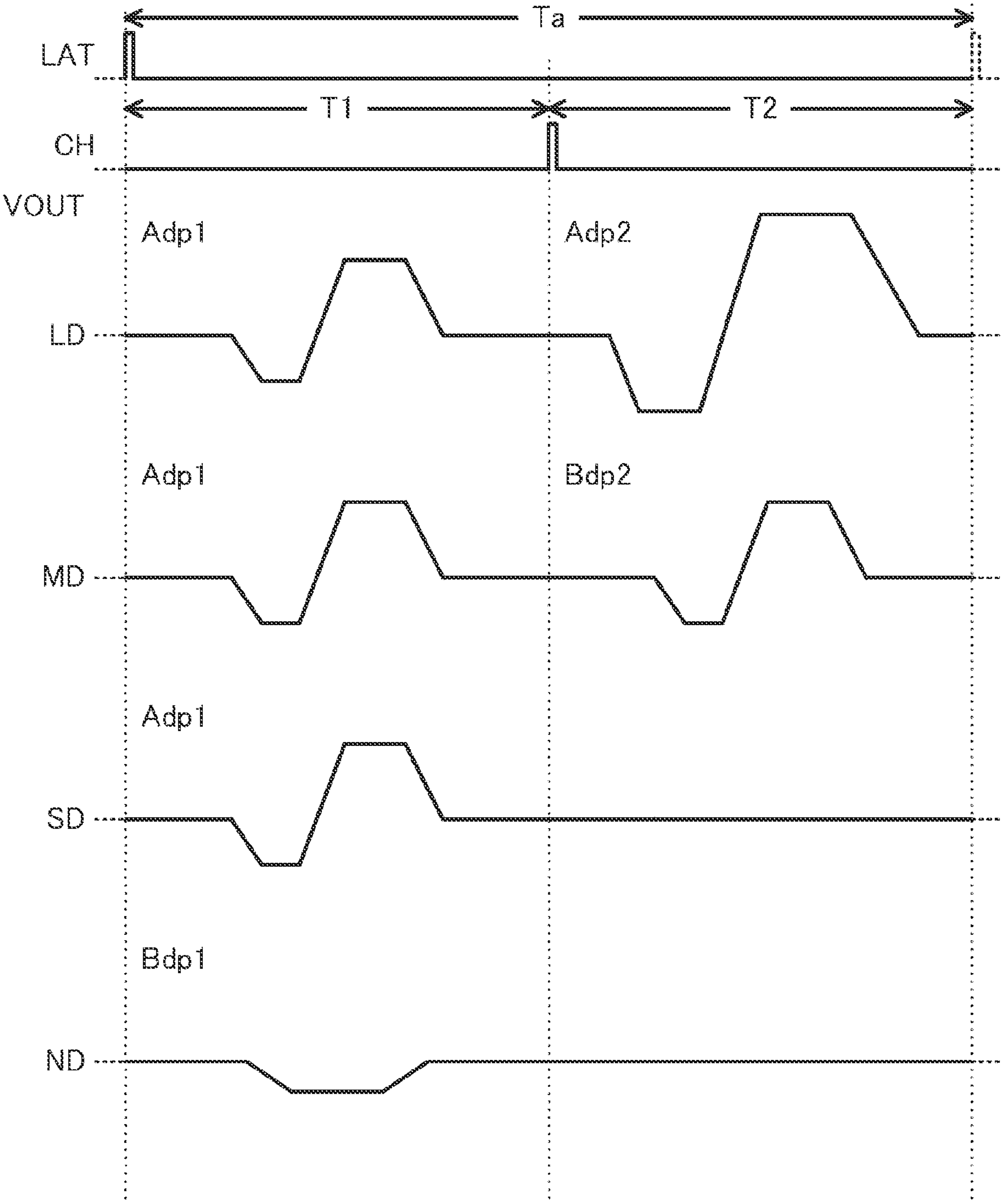
FIG. 5 is a view illustrating an example of a waveform of a driving signal.

FIG. 5 is a view illustrating an example of a waveform of the driving signal VOUT. FIG. 5 is a view illustrating comparison of the waveform of the driving signal VOUT with waveforms of each case where the size of the dots formed on the medium P is any of a “large dot LD”, a “medium dot MD”, a “small dot SD”, and “non-recording ND”.

As illustrated in FIG. 5, the driving signal VOUT when the large dot LD is formed on the medium P has a waveform in which the trapezoidal waveform Adp1 disposed in the period T1 and the trapezoidal waveform Adp2 disposed in the period T2 in the cycle Ta are continuous to each other. When the driving signal VOUT is supplied to the discharge section 600, a small amount of ink and a medium amount of ink are discharged from the corresponding nozzles 651 in the cycle Ta. Therefore, on the medium P, each ink lands and coalesces to form the large dots LD.

The driving signal VOUT when the medium dot MD is formed on the medium P has a waveform in which the trapezoidal waveform Adp1 disposed in the period T1 and the trapezoidal waveform Bdp2 disposed in the period T2 are continuous to each other in the cycle Ta. When the driving signal VOUT is supplied to the discharge section 600, a small amount of ink is discharged twice from the corresponding nozzles 651 in the cycle Ta. Therefore, on the medium P, each ink lands and coalesces to form the medium dots MD.

The driving signal VOUT when the small dot SD is formed on the medium P has a waveform in which the trapezoidal waveform Adp1 disposed in the period T1 and a constant waveform disposed in the period T2 at the voltage Vc are continuous to each other in the cycle Ta. When the driving signal VOUT is supplied to the discharge section 600, a small amount of ink is discharged from the corresponding nozzles 651 in the cycle Ta. Therefore, on the medium P, each ink lands to form the small dots SD.

The driving signal VOUT that corresponds to the non-recording ND that does not form dots on the medium P has a waveform in which the trapezoidal waveform Bdp1 disposed in the period T1 and a constant waveform disposed in the period T2 at the voltage Vc are continuous to each other in the cycle Ta. When the driving signal VOUT is supplied to the discharge section 600, in the cycle Ta, only by the slight vibration of the ink near the opening portion of the corresponding nozzle 651, the ink is not discharged. Therefore, on the medium P, the ink does not land and no dot is formed.

Here, the constant waveform at the voltage Vc is a waveform in which the immediately preceding voltage Vc becomes a voltage held by the piezoelectric element 60 which is a capacitive load, when none of the trapezoidal waveforms Adp1, Adp2, Bdp1, and Bdp2 is selected as the driving signal VOUT. In other words, when none of the trapezoidal waveforms Adp1, Adp2, Bdp1, and Bdp2 is selected as the driving signal VOUT, the voltage Vc is supplied to the discharge section 600 as the driving signal VOUT.

Figure 6:
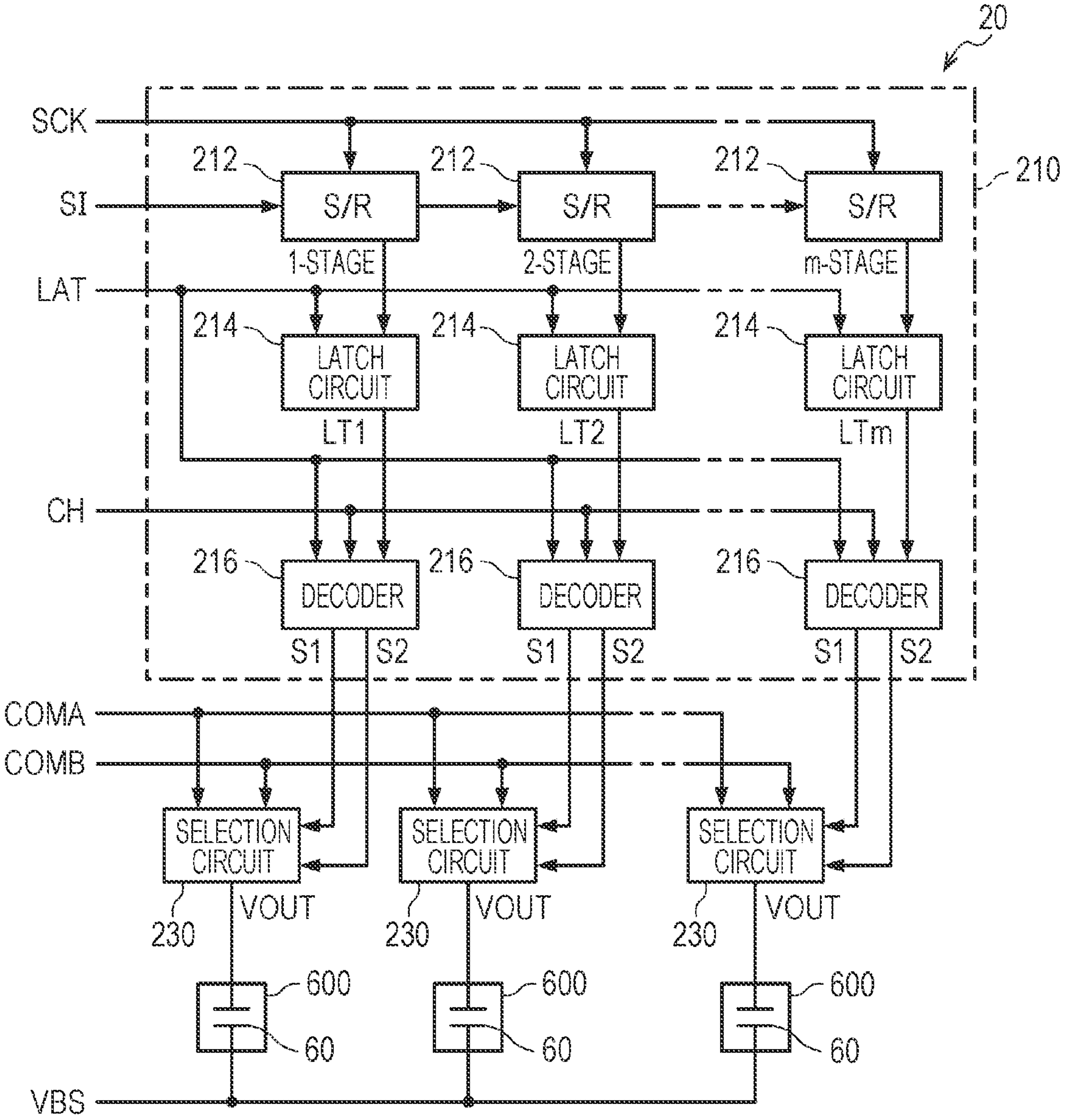
FIG. 6 is a view illustrating a configuration of a selection control circuit and a selection circuit.

The driving signal VOUT as described above is generated by selecting or deselecting the waveforms of the driving signals COMA and COMB by the operations of the selection control circuit 210 and the selection circuit 230. FIG. 6 is a view illustrating a configuration of the selection control circuit 210 and the selection circuit 230. As illustrated in FIG. 6, the print data signal SI, the latch signal LAT, the change signal CH, and the clock signal SCK are input to the selection control circuit 210. In the selection control circuit 210, sets of a shift register (S/R) 212, a latch circuit 214, and a decoder 216 are provided corresponding to each of m discharge sections 600. In other words, the selection control circuit 210 includes the same number of sets of the shift register 212, the latch circuit 214, and the decoder 216 as that of m discharge sections 600.

The print data signal SI is a signal synchronized with the clock signal SCK, and is a signal of a total of 2 m bits including 2-bit print data [SIH, SIL] for selecting any one of the large dot LD, the medium dot MD, the small dot SD, and the non-recording ND with respect to each of m discharge sections 600. The input print data signal SI is held in the shift register 212 for each of the two bits of print data [SIH, SIL] included in the print data signal SI, corresponding to m discharge sections 600. Specifically, in the selection control circuit 210, the m-stage shift registers 212 that correspond to m discharge sections 600 are vertically coupled to each other, and the serially input print data signal SI is sequentially transferred to the subsequent stage according to the clock signal SCK. In FIG. 6, in order to distinguish the shift registers 212 from each other, the shift register 212 is denoted as 1-stage, 2-stage, . . . , and m-stage in order from the upstream to which the print data signal SI is input.

Each of m latch circuits 214 latches the 2-bit print data [SIH, SIL] held by each of m shift registers 212 at the rise of the latch signal LAT.

Figures 7, 8:
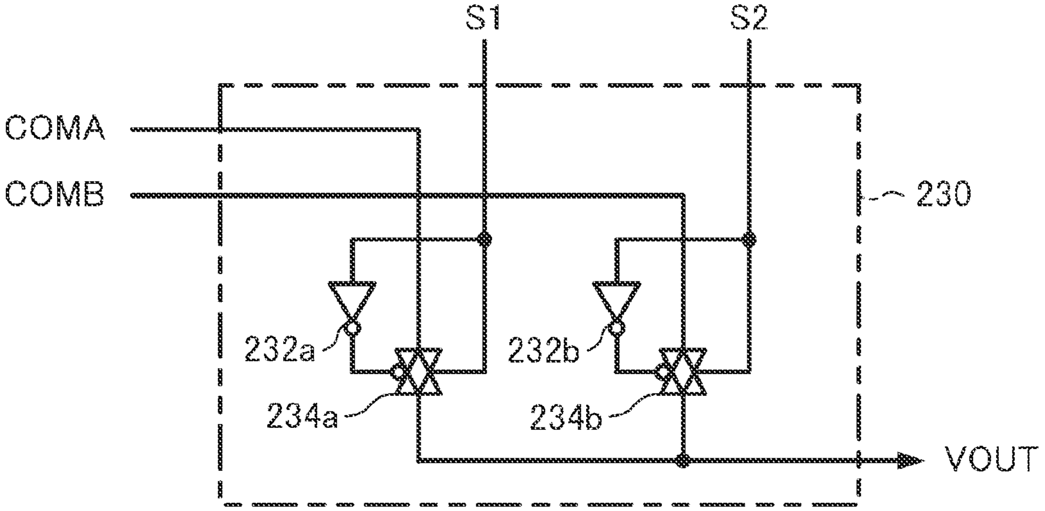
FIG. 7 is a view illustrating decoding contents in a decoder.
FIG. 8 is a view illustrating a configuration of the selection circuit that corresponds to one discharge section.

FIG. 7 is a view illustrating the decoding contents in the decoder 216. The decoder 216 outputs the selection signals S1 and S2 according to the 2-bit print data [SIH, SIL] latched by the latch circuit 214. For example, when the 2-bit print data [SIH, SIL] is [1, 0], the decoder 216 outputs the logic level of the selection signal S1 as the H and L levels in the periods T1 and T2, and outputs the logic level of the selection signal S2 to the selection circuit 230 as the L and H levels in the periods T1 and T2.

The selection circuit 230 is provided corresponding to each of the discharge sections 600. In other words, the number of selection circuits 230 of the print head 20 is m, which is the same as the total number of the discharge sections 600. FIG. 8 is a view illustrating a configuration of the selection circuit 230 that corresponds to one discharge section 600. As illustrated in FIG. 8, the selection circuit 230 has inverters 232*a* and 232*b*, which are NOT circuits, and transfer gates 234*a* and 234*b*.

While the selection signal S1 is input to a positive control end, which is not marked with a circle, at the transfer gate 234*a*, the selection signal S1 is logically inverted by the inverter 232*a* and is input to a negative control end marked with a circle at the transfer gate 234*a*. The driving signal COMA is supplied to the input end of the transfer gate 234*a*. While the selection signal S2 is input to a positive control end, which is not marked with a circle at the transfer gate 234*b*, the selection signal S2 is logically inverted by the inverter 232*b* and is input to a negative control end marked with a circle at the transfer gate 234*b*. The driving signal COMB is supplied to the input end of the transfer gate 234*b*. Then, the output ends of the transfer gates 234*a* and 234*b* are commonly coupled to each other, and the signal is output as the driving signal VOUT.

Specifically, the transfer gate 234*a* conducts the input end and the output end to each other when the selection signal S1 is the H level, and does not conduct the input end and the output end to each other when the selection signal S1 is the L level. The transfer gate 234*b* conducts the input end and the output end to each other when the selection signal S2 is the H level, and does not conduct the input end and the output end to each other when the selection signal S2 is the L level. As described above, the selection circuit 230 generates the driving signal VOUT by selecting the waveforms of the driving signals COMA and COMB based on the selection signals S1 and S2, and outputs the generated driving signal VOUT.

Figure 9:
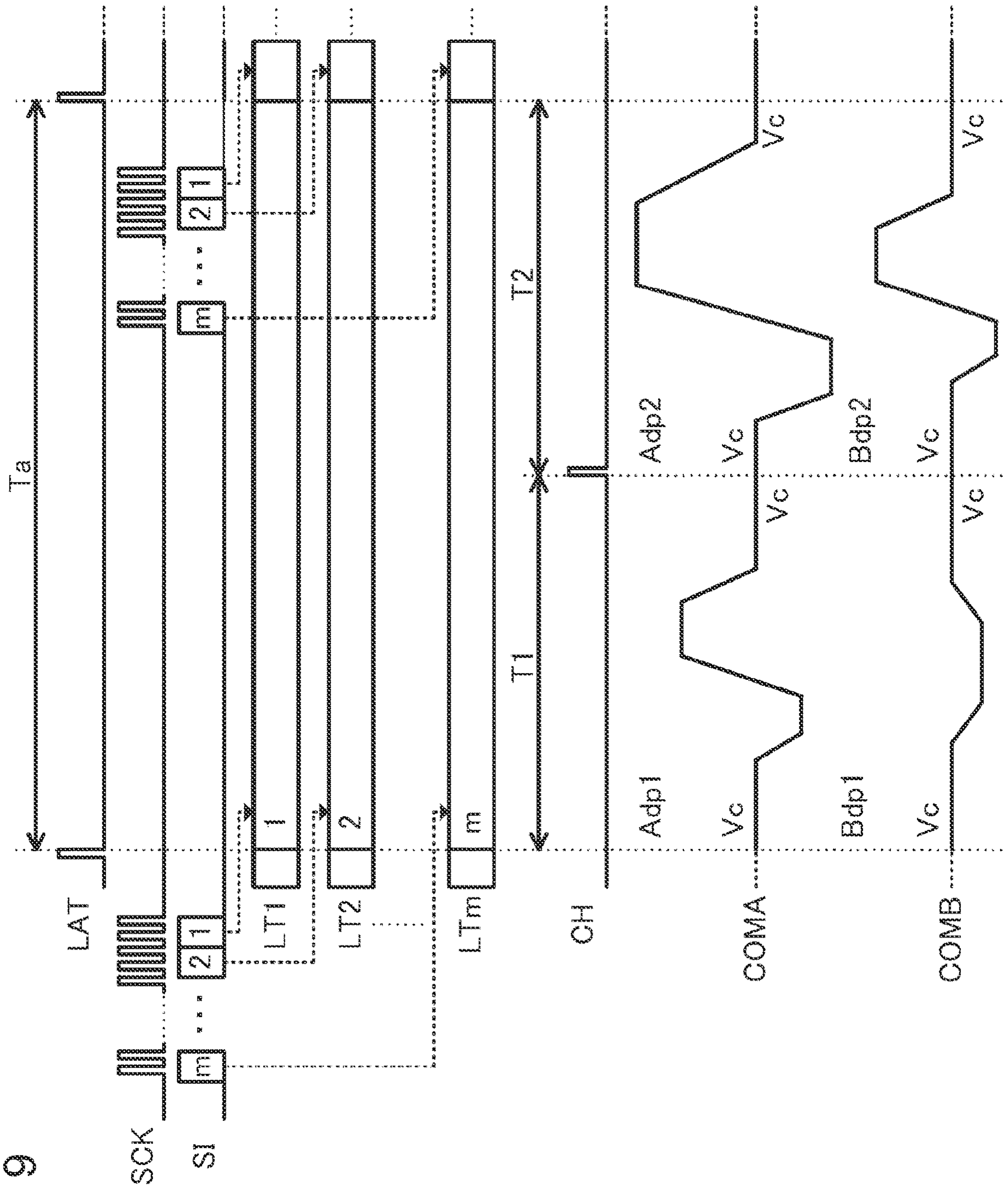
FIG. 9 is a view for describing operations of the selection control circuit and the selection circuit.

Here, the operations of the selection control circuit 210 and the selection circuit 230 will be described with reference to FIG. 9. FIG. 9 is a view for describing the operations of the selection control circuit 210 and the selection circuit 230. The print data signals SI are serially input in synchronization with the clock signal SCK and sequentially transferred in the shift register 212 that corresponds to the discharge section 600. Then, when the input of the clock signal SCK is stopped, the 2-bit print data [SIH, SIL] that corresponds to each of the discharge sections 600 is held in each of the shift registers 212. The print data signal SI is input in order that corresponds to the m-stage, . . . , 2-stage, and 1-stage discharge sections 600 of the shift register 212.

When the latch signal LAT rises, each of the latch circuits 214 latches the 2-bit print data [SIH, SIL] held in the shift register 212 all at once. In FIG. 9, LT1, LT2, . . . , and LTm indicate the 2-bit print data [SIH, SIL] latched by the latch circuit 214 that corresponds to the 1-stage, 2-stage, . . . , and the m-stage shift registers 212.

The decoder 216 outputs the logic levels of the selection signals S1 and S2 in each of the periods T1 and T2 with the contents illustrated in FIG. 7, depending on the size of the dot defined by the latched 2-bit print data [SIH, SIL].

Specifically, when the input print data [SIH, SIL] is [1, 1], the decoder 216 sets the selection signal S1 to the H and H levels in the periods T1 and T2, and sets the selection signal S2 to the L and L levels in the periods T1 and T2. In this case, the selection circuit 230 selects the trapezoidal waveform Adp1 in the period T1 and selects the trapezoidal waveform Adp2 in the period T2. As a result, the driving signal VOUT that corresponds to the large dot LD illustrated in FIG. 5 is generated.

In addition, when the print data [SIH, SIL] is [1, 0], the decoder 216 sets the selection signal S1 to the H and L levels in the periods T1 and T2, and sets the selection signal S2 to the L and H levels in the periods T1 and T2. In this case, the selection circuit 230 selects the trapezoidal waveform Adp1 in the period T1 and selects the trapezoidal waveform Bdp2 in the period T2. As a result, the driving signal VOUT that corresponds to the medium dot MD illustrated in FIG. 5 is generated.

In addition, when the print data [SIH, SIL] is [0, 1], the decoder 216 sets the selection signal S1 to the H and L levels in the periods T1 and T2, and sets the selection signal S2 to the L and L levels in the periods T1 and T2. In this case, the selection circuit 230 selects the trapezoidal waveform Adp1 in the period T1 and selects none of the trapezoidal waveforms Adp2 and Bdp2 in the period T2. As a result, the driving signal VOUT that corresponds to the small dot SD illustrated in FIG. 5 is generated.

In addition, when the print data [SIH, SIL] is [0, 0], the decoder 216 sets the selection signal S1 to the L and L levels in the periods T1 and T2, and sets the selection signal S2 to the H and L levels in the periods T1 and T2. In this case, the selection circuit 230 selects the trapezoidal waveform Bdp1 in the period T1 and selects none of the trapezoidal waveforms Adp2 and Bdp2 in the period T2. As a result, the driving signal VOUT that corresponds to the non-recording ND illustrated in FIG. 5 is generated.

As described above, the selection control circuit 210 and the selection circuit 230 select the waveforms of the driving signals COMA and COMB based on the print data signal SI, the latch signal LAT, the change signal CH, and the clock signal SCK, and outputs the selected waveforms to the discharge section 600 as the driving signal VOUT.

5. Configuration of Driving Signal Output Circuit

Figure 10:
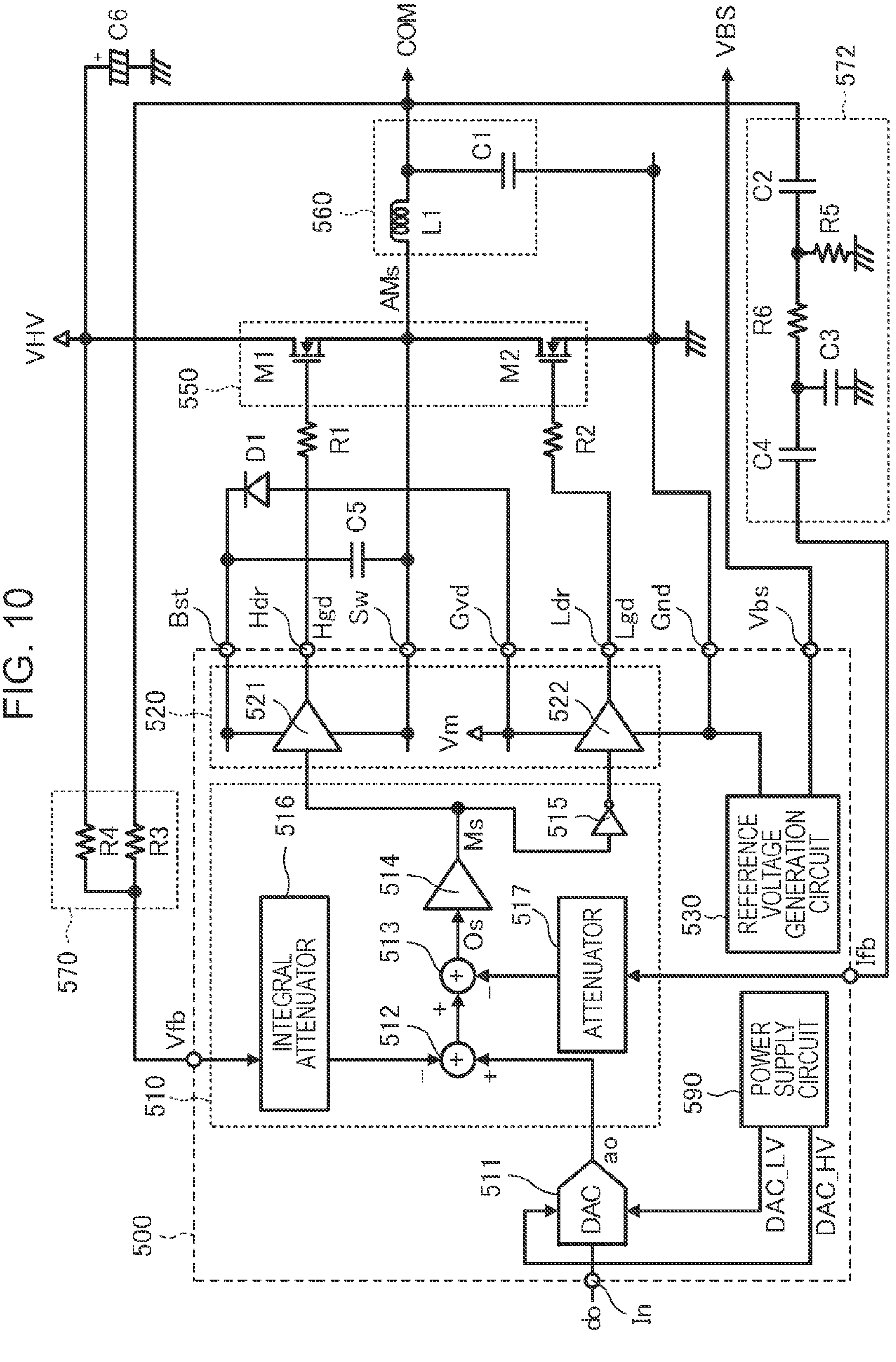
FIG. 10 is a view illustrating an electrical configuration of a driving signal output circuit.

Next, the configuration and operations of the driving signal output circuits 51*a* and 51*b* that output the driving signals COMA and COMB will be described. FIG. 10 is a view illustrating an electrical configuration of the driving signal output circuits 51*a* and 51*b*. Here, the driving signal output circuit 51*a* and the driving signal output circuit 51*b* differ only in the input signal and the output signal, and have the same configuration. Therefore, in the following description, the driving signal output circuits 51*a* and 51*b* will be simply referred to as the driving signal output circuit 51 without distinction, and the configuration and operation thereof will be described. In this case, the signal output by the driving signal output circuit 51 is simply referred to as a driving signal COM, and the signal that is a reference of the driving signal COM is referred to as a reference driving signal do.

As illustrated in FIG. 10, the driving signal output circuit 51 includes an integrated circuit 500 including a modulation circuit 510; an amplifier circuit 550; a smoothing circuit 560; and feedback circuits 570 and 572.

The integrated circuit 500 has a plurality of terminals including a terminal In, a terminal Bst, a terminal Hdr, a terminal Sw, a terminal Gvd, a terminal Ldr, a terminal Gnd, and a terminal Vbs. In the integrated circuit 500, the integrated circuit 500 and the outside are electrically coupled to each other via the plurality of terminals. As illustrated in FIG. 10, the integrated circuit 500 includes a digital to analog converter (DAC) 511, a modulation circuit 510, a gate drive circuit 520, a reference voltage generation circuit 530, and a power supply circuit 590.

The power supply circuit 590 generates a first voltage signal DAC_HV and a second voltage signal DAC_LV, and supplies the generated signals to the DAC 511. The DAC 511 converts the digital reference driving signal do that defines the waveform of the input driving signal COM into a reference driving signal ao which is an analog signal of the voltage value between the first voltage signal DAC_HV and the second voltage signal DAC_LV, and outputs the reference driving signal ao to the modulation circuit 510. Here, the maximum value of the voltage amplitude of the reference driving signal ao is defined by the first voltage signal DAC_HV, and the minimum value is defined by the second voltage signal DAC_LV. In other words, the first voltage signal DAC_HV is a reference voltage on a high voltage side of the DAC 511, and the second voltage signal DAC_LV is a reference voltage on a low voltage side of the DAC 511. Then, a signal obtained by amplifying the analog reference driving signal ao becomes the driving signal COM. In other words, the reference driving signal ao corresponds to a target signal before amplification of the driving signal COM. In other words, the reference driving signal ao and the digital reference driving signal do that is the reference of the reference driving signal ao are signals that are references of the driving signal COM.

The modulation circuit 510 generates a modulated signal Ms obtained by modulating the reference driving signal ao, and outputs the generated modulated signal Ms to the gate drive circuit 520. The modulation circuit 510 includes adders 512 and 513, a comparator 514, an inverter 515, an integral attenuator 516, and an attenuator 517.

The integral attenuator 516 attenuates and integrates the driving signal COM input via a terminal Vfb, and supplies the driving signal COM to the input end on the − side of the adder 512. The reference driving signal ao is input to the input end on the + side of the adder 512. Then, the adder 512 supplies the voltage obtained by subtracting and integrating the voltage input to the input end on the − side from the voltage input to the input end on the + side, to the input end on the + side of the adder 513. Here, while the maximum value of the voltage amplitude of the reference driving signal ao is approximately 2 V as described above, there is a case where the maximum value of the voltage of the driving signal COM exceeds 40 V. Therefore, the integral attenuator 516 attenuates the voltage of the driving signal COM input via the terminal Vfb in order to match the amplitude ranges of both voltages when obtaining the deviation.

In addition, the attenuator 517 supplies a voltage obtained by attenuating the high frequency component of the driving signal COM input via a terminal Ifb, to the input end on the − side of the adder 513. The voltage output from the adder 512 is input to the input end on the + side of the adder 513. Then, the adder 513 outputs a voltage signal Os, which is obtained by subtracting the voltage input to the input end on the − side from the voltage input to the input end on the + side, to the comparator 514.

The voltage signal Os output from the adder 513 is a voltage obtained by subtracting the voltage of the signal supplied to the terminal Vfb, and further subtracting the voltage of the signal supplied to the terminal Ifb, from the voltage of the reference driving signal ao. Therefore, the voltage of the voltage signal Os output from the adder 513 becomes a signal obtained by correcting the deviation, which is obtained by subtracting the attenuated voltage of the driving signal COM from the voltage of the target reference driving signal ao, with the high frequency component of the driving signal COM.

The comparator 514 outputs the modulated signal Ms obtained by pulse-modulating the voltage signal Os output from the adder 513. Specifically, the comparator 514 outputs the modulated signal Ms that becomes an H level when the voltage signal Os output from the adder 513 reaches a predetermined threshold value Vth1 or greater when the voltage rises, and becomes an L level when the voltage signal Os falls below a predetermined threshold value Vth2 when the voltage drops. Here, the threshold values Vth1 and Vth2 are set in the relationship of threshold value Vth1>threshold value Vth2. Here, the frequency and duty ratio of the modulated signal Ms change according to the reference driving signals do and ao. Therefore, as the attenuator 517 adjusts the modulation gain that corresponds to the sensitivity, it is possible to adjust the amount of change in the frequency and duty ratio of the modulated signal Ms.

The modulated signal Ms output from the comparator 514 is supplied to a gate driver 521 included in the gate drive circuit 520. The modulated signal Ms is also supplied to the gate driver 522 included in the gate drive circuit 520 after the logic level is inverted by the inverter 515. In other words, the logic levels of the signals supplied to the gate driver 521 and the gate driver 522 are in a relationship exclusive to each other.

Here, the timing may be controlled such that the logic levels of the signals supplied to the gate driver 521 and the gate driver 522 do not become the H level at the same time. In other words, strictly speaking, the relationship exclusive to each other means that the logic levels of the signals supplied to the gate driver 521 and the gate driver 522 do not become the H level at the same time, and more specifically means that the transistor M1 and the transistor M2 included in the amplifier circuit 550 (will be described later) are not turned on at the same time.

The gate drive circuit 520 includes the gate driver 521 and the gate driver 522. The gate driver 521 level-shifts the modulated signal Ms output from the comparator 514 and outputs the level-shifted modulated signal Ms from the terminal Hdr as an amplification control signal Hgd. The higher side of the power source voltage of the gate driver 521 is a voltage applied via the terminal Bst, and the lower side is a voltage applied via the terminal Sw. The terminal Bst is coupled to one end of a capacitor C5 and the cathode of a diode Dl for preventing a reverse flow. The terminal Sw is coupled to the other end of the capacitor C5. The anode of the diode Dl is coupled to the terminal Gvd. Accordingly, the anode of the diode Dl is supplied with a voltage Vm, which is a DC voltage of, for example, 7.5 V, which is supplied from a power supply circuit (not illustrated). Therefore, the potential difference between the terminal Bst and the terminal Sw is approximately equal to the potential difference between both ends of the capacitor C5, that is, the voltage Vm. Then, the gate driver 521 outputs the amplification control signal Hgd having a voltage greater than that of the terminal Sw by the voltage Vm following the input modulated signal Ms, from the terminal Hdr.

The gate driver 522 operates on the lower potential side than that of the gate driver 521. The gate driver 522 level-shifts the signal in which the logic level of the modulated signal Ms output from the comparator 514 is inverted by the inverter 515, and outputs the level-shifted signal from the terminal Ldr as the amplification control signal Lgd. The voltage Vm is applied to the higher side of the power source voltage of the gate driver 522, and a ground potential of, for example, 0 V is supplied to the lower side via the terminal Gnd. Then, the amplification control signal Lgd having a voltage greater than that of the terminal Gnd by the voltage Vm following the signal input to the gate driver 522 is output from the terminal Ldr.

Here, the signal obtained by modulating the reference driving signal do and the reference driving signal ao means the modulated signal Ms output by the comparator 514 in a narrow sense, but when considering that the signal is a signal obtained by pulse-modulating the analog reference driving signal ao based on the digital reference driving signal do, a signal in which the logic level of the modulated signal Ms is inverted is also a signal obtained by modulating the reference driving signal do and the reference driving signal ao. In other words, the signals obtained by modulating the reference driving signal do and the reference driving signal ao include not only the modulated signal Ms output by the comparator 514 but also a signal in which the logic level of the modulated signal Ms output by the comparator 514 is inverted, or a signal in which the timing is controlled with respect to the modulated signal Ms. Furthermore, the amplification control signal Hgd output by the gate driver 521 is a signal obtained by level-shifting the input modulated signal Ms, and the amplification control signal Lgd output by the gate driver 522 is a signal obtained by level-shifting the signal in which the logic level of the modulated signal Ms inverted. Then, the amplification control signals Hgd and Lgd output by the gate drivers 521 and 522, that is, the amplification control signals Hgd and Lgd output from the integrated circuit 500, are also signals obtained by modulating the reference driving signal do and the reference driving signal ao.

The reference voltage generation circuit 530 generates the reference voltage signal VBS supplied to the electrode 612 of the piezoelectric element 60, and outputs the generated reference voltage signal VBS to the electrode 612 of the piezoelectric element 60 via the terminal Vbs of the integrated circuit 500. The reference voltage generation circuit 530 is configured with, for example, a constant voltage circuit including a band gap reference circuit.

Here, in FIG. 10, the reference voltage generation circuit 530 is described as being included in the integrated circuit 500 of the driving signal output circuit 51, but the reference voltage generation circuit 530 may be configured outside the integrated circuit 500, and may further be configured outside the driving signal output circuit 51.

The amplifier circuit 550 includes the transistor M1 and the transistor M2. The drain of the transistor M1 is supplied with the voltage VHV. The gate of the transistor M1 is electrically coupled to one end of a resistor R1, and the other end of the resistor R1 is electrically coupled to the terminal Hdr of the integrated circuit 500. In other words, the amplification control signal Hgd output from the terminal Hdr of the integrated circuit 500 is supplied to the gate of the transistor M1. The source of the transistor M1 is electrically coupled to the terminal Sw of the integrated circuit 500.

The drain of the transistor M2 is electrically coupled to the terminal Sw of the integrated circuit 500. In other words, the drain of the transistor M2 and the source of the transistor M1 are electrically coupled to each other. The gate of the transistor M2 is electrically coupled to one end of a resistor R2, and the other end of the resistor R2 is electrically coupled to the terminal Ldr of the integrated circuit 500. In other words, the amplification control signal Lgd output from the terminal Ldr of the integrated circuit 500 is supplied to the gate of the transistor M2. The ground potential is supplied to the source of the transistor M2.

In the amplifier circuit 550 configured as described above, when the transistor M1 is controlled to be turned off and the transistor M2 is controlled to be turned on, the voltage of the node to which the terminal Sw is coupled becomes the ground potential. Therefore, the voltage Vm is supplied to the terminal Bst. Meanwhile, when the transistor M1 is controlled to be turned on and the transistor M2 is controlled to be turned off, the voltage of the node to which the terminal Sw is coupled becomes the voltage VHV. Therefore, a voltage signal having a potential of a voltage VHV+Vm is supplied to the terminal Bst.

In other words, the gate driver 521 that drives the transistor M1 uses the capacitor C5 as a floating power source, the potential of the terminal Sw changes to 0 V or the voltage VHV corresponding to the operation of the transistor M1 and the transistor M2, and accordingly, the amplification control signal Hgd, of which the L level is a potential of the voltage VHV and the H level is the potential of the voltage VHV+the voltage Vm, is supplied to the gate of the transistor M1.

Meanwhile, the gate driver 522 that drives the transistor M2 supplies the amplification control signal Lgd, of which the L level is the ground potential and the H level is the potential of the voltage Vm, to the gate of the transistor M2, regardless of the operation of the transistor M1 and the transistor M2.

As described above, the amplifier circuit 550 amplifies the modulated signal Ms obtained by modulating the reference driving signals do and ao by the transistor M1 and the transistor M2 based on the voltage VHV. Accordingly, the amplified modulated signal AMs is generated at the coupling point where the source of the transistor M1 and the drain of the transistor M2 are commonly coupled to each other. Then, the amplified modulated signal AMs generated by the amplifier circuit 550 is input to the smoothing circuit 560.

The smoothing circuit 560 generates the driving signal COM by smoothing the amplified modulated signals AMs output from the amplifier circuit 550, and outputs the generated driving signal COM from the driving signal output circuit 51.

The smoothing circuit 560 includes an inductor L1 and a capacitor C1. The amplified modulated signal AMs output from the amplifier circuit 550 is input to one end of the inductor L1. The other end of the inductor L1 is also coupled to one end of the capacitor C1. A ground potential is supplied to the other end of the capacitor C1. In other words, the inductor L1 and the capacitor C1 are demodulated by smoothing the amplified modulated signal AMs output from the amplifier circuit 550, and the demodulated signal is output as the driving signal COM.

The feedback circuit 570 includes a resistor R3 and a resistor R4. The driving signal COM is supplied to one end of the resistor R3, and the other end is coupled to the terminal Vfb and one end of the resistor R4. The voltage VHV is supplied to the other end of the resistor R4. Accordingly, the driving signal COM that passes through the feedback circuit 570 is fed back to the terminal Vfb by the voltage VHV in a pulled-up state.

The feedback circuit 572 includes capacitors C2, C3, and C4 and resistors R5 and R6. The driving signal COM is supplied to one end of the capacitor C2, and the other end is coupled to one end of the resistor R5 and one end of the resistor R6. A ground potential is supplied to the other end of the resistor R5. Accordingly, the capacitor C2 and the resistor R5 function as a high pass filter. A cutoff frequency of the high pass filter is set to, for example, approximately 9 MHz. The other end of the resistor R6 is coupled to one end of the capacitor C4 and one end of the capacitor C3. The ground potential is supplied to the other end of the capacitor C3. Accordingly, the resistor R6 and the capacitor C3 function as a low pass filter. The cutoff frequency of the low pass filter is set to, for example, approximately 160 MHz. In this manner, the feedback circuit 572 includes the high pass filter and the low pass filter, and functions as a band pass filter that allows the signal having a predetermined frequency range of the driving signal COM to pass therethrough.

The other end of the capacitor C4 is coupled to the terminal Ifb of the integrated circuit 500. Accordingly, a signal, in which the DC component is cut among the high frequency components of the driving signal COM that passes through the feedback circuit 572 that functions as a band pass filter, is fed back to the terminal Ifb.

Incidentally, the driving signal COM is a signal obtained by smoothing the amplified modulated signal AMs by the smoothing circuit 560. Then, the driving signal COM is integrated and subtracted via the terminal Vfb, and then fed back to the adder 512. Accordingly, the driving signal output circuit 51*a* self-excited oscillates at a frequency determined by the feedback delay and the feedback transfer function. In this case, since the feedback path via the terminal Vfb has a large delay amount, there is a possibility that the frequency of self-excited oscillation cannot be high enough to ensure the accuracy of the driving signal COM only by the feedback via the terminal Vfb. Here, by providing a path for feeding back the high frequency component of the driving signal COM via the terminal Ifb separately from the path via the terminal Vfb, the delay in the entire circuit is reduced. Accordingly, the frequency of the voltage signal Os can be made high enough to ensure the accuracy of the driving signal COM compared to a case where the path via the terminal Ifb does not exist.

Here, the driving signal COM output by the driving signal output circuit 51 is selected or deselected in the selection circuit 230, and is supplied to the piezoelectric element 60 as the driving signal VOUT supplied to the electrode 611 of the piezoelectric element 60. In other words, the output current based on the driving signal COM output by the driving signal output circuit 51 changes corresponding to the number of piezoelectric elements 60 supplied as the driving signal VOUT. Then, there is a concern that the voltage value of the voltage VHV input to the driving signal output circuit 51 fluctuates due to the change in the output current of the driving signal output circuit 51. As a result, there is a concern that the waveform accuracy of the driving signal COM generated by amplification based on the voltage VHV deteriorates.

To solve such a problem, the driving signal output circuit 51 in the present embodiment includes a capacitor C6 for reducing the voltage fluctuation of the voltage VHV when the output current changes. In other words, the driving signal output circuit 51 includes the capacitor C6 electrically coupled to a propagation path through which the voltage VHV propagates as a power source voltage supplied to the amplifier circuit 550. The capacitor C6 is required to have a relatively large capacity, that is, a withstand voltage equal to or higher than the voltage value of the voltage VHV in order to reduce the voltage fluctuation of the voltage VHV with respect to the change in the output current generated by the driving signal COM. Therefore, as the capacitor C6, an electrolytic capacitor having a relatively large capacity and a withstand voltage of several tens of V or greater is used. Accordingly, the concern that the voltage value of the voltage VHV fluctuates due to the change in the output current of the driving signal output circuit 51 can be reduced.

As described above, the driving signal output circuit 51 in the present embodiment is configured as a so-called class D amplifier circuit that outputs the driving signal COM, including the integrated circuit 500 that outputs the amplification control signals Hgd and Lgd obtained by level-shifting the modulated signals Ms obtained by modulating the reference driving signal do that is the reference of the driving signal COM; the amplifier circuit 550 that outputs the amplified modulated signal AMs by driving the transistor M1 driven by the amplification control signal Hgd and the transistor M2 driven by the amplification control signal Lgd; and the smoothing circuit 560 that has an inductor L1 and outputs the driving signal COM obtained by demodulating the amplified modulated signal AMs. Accordingly, the power consumption of the liquid discharge apparatus 1 having the driving signal output circuit 51 can be reduced.

Meanwhile, in the liquid discharge apparatus 1, the number of nozzles provided in the print head 20 increases in the liquid discharge apparatus 1 in response to the market demand for further improvement of ink discharge accuracy and further increase in discharge speed. As the number of nozzles increases, the number of piezoelectric elements 60 of the print head 20 increases, and as a result, the output current output by the driving signal output circuit 51 that outputs the driving signal COM that drives the piezoelectric elements 60 increases. In other words, the amount of current flowing through the inductor L1 that outputs the driving signal COM in the driving signal output circuit 51 increases.

As the amount of current flowing through the inductor L1 increases, the DC current component flowing through the inductor L1 also increases, and as a result, there is a case where magnetic saturation occurs in the magnetic material contained in the inductor L1. In other words, when the number of nozzles of the liquid discharge apparatus 1 increases, there is a concern that the inductance component of the inductor L1 of the driving signal output circuit 51 decreases. Such a decrease in the inductance component of the inductor L1 reduces the waveform accuracy of the driving signal COM output by the driving signal output circuit 51, and as a result, a problem is caused in which there is a concern that the ink discharge accuracy in the liquid discharge apparatus 1 deteriorates.

Figure 11:
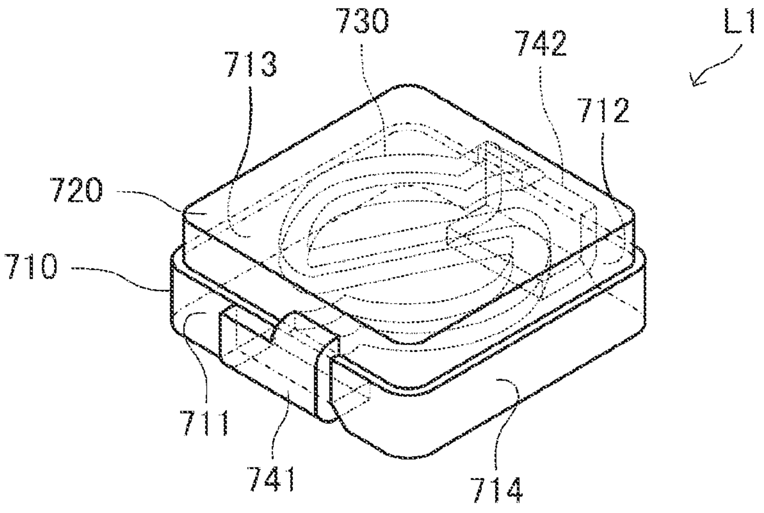
FIG. 11 is a perspective view illustrating a structure of an inductor.
Figure 12:
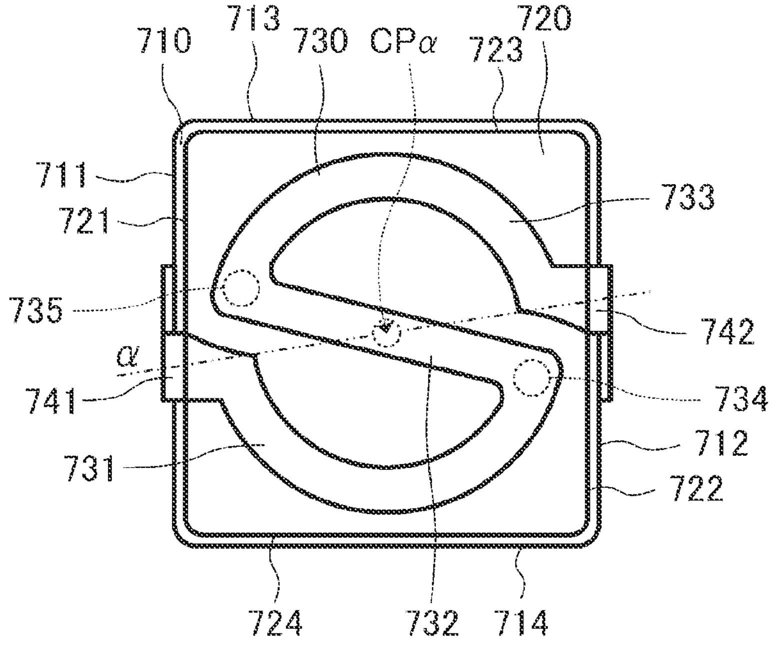
FIG. 12 is a view for describing an internal structure of the inductor.

To solve such a problem, the driving signal output circuit 51 in the present embodiment uses the inductor L1 having a characteristic structure as illustrated in FIGS. 11 and 12. Accordingly, even when the amount of current flowing through the inductor L1 increases, the concern that magnetic saturation occurs in the inductor L1 is reduced, and as a result, the concern that the waveform accuracy of the driving signal COM output by the driving signal output circuit 51 deteriorates is reduced.

FIG. 11 is a perspective view illustrating a structure of the inductor L1. FIG. 12 is a view for describing an internal structure of the inductor L1. In FIG. 11, a part of the configuration positioned inside the inductor L1 and on the back surface in FIG. 11 is illustrated by a broken line. In FIG. 12, the shape of a lead member 730 of the inductor L1 is described, and a part of the inductor L1 is made transparent and illustrated.

As illustrated in FIG. 11, the inductor L1 includes a support member 710, a guide member 720, the lead member 730, and terminals 741 and 742.

The support member 710 includes a side surface 711; a side surface 712 positioned facing the side surface 711; a side surface 713 intersecting with the side surface 711 and the side surface 712; and a side surface 714 positioned facing the side surface 713, and has a substantially rectangular parallelepiped shape having an internal space surrounded by the side surfaces 711, 712, 713, and 714. Then, the lead member 730 and the guide member 720 are accommodated in the internal space surrounded by the side surfaces 711, 712, 713, and 714, and accordingly, the support member 710 supports the lead member 730 and the guide member 720.

The terminal 741 is provided on the side surface 711, and the terminal 742 is provided on the side surface 712. Specifically, the terminal 741 is a flat plate extending along the side surface 711, and is fixed to the side surface 711 by being bent and crimped to the side surface 711. In addition, the terminal 742 is a flat plate extending along the side surface 712, and is fixed to the side surface 712 by being bent and crimped to the side surface 712.

The lead member 730 has one end electrically coupled to the terminal 741 and the other end electrically coupled to the terminal 742, and is provided on the inside of the space surrounded by side surfaces 711, 712, 713, and 714. In this case, the lead member 730 has a winding zigzag shape in a plan view of the so-called inductor L1, in a direction intersecting with the direction from the side surface 711 toward the side surface 712 and the direction intersecting with the direction from the side surface 713 toward the side surface 714. In the present embodiment, the lead member 730 will be described as having a substantially S shape. The lead member 730 is formed, for example, by stamping a raw material such as a flat plate. The lead member 730 may be formed by bending and folding the raw material in addition to the above-described stamping, or may be formed by bending and folding the raw material instead of the above-described stamping.

The lead member 730 and the terminals 741 and 742 may be electrically coupled to each other by welding or the like, but it is preferable that the lead member 730 and the terminals 741 and 742 are formed by processing from one raw material. In other words, it is preferable that the lead member 730 and the terminals 741 and 742 are integrally formed without welding or the like. When the lead member 730 and the terminals 741 and 742 are joined to each other by welding or the like, there is a case where characteristics such as an impedance change at the joint section. There is a concern that such a characteristics change causes unintended heat generation in the inductor L1, and there is a possibility that the magnetic field generated by the inductor L1 is disturbed. By integrally configuring the lead member 730 and the terminals 741 and 742 without using welding or the like, the concern that such a characteristics change occurs is reduced, and as a result, the waveform accuracy of the driving signal COM output from the inductor L1 is improved. The details of the shape of the lead member 730 having a substantially S shape will be described later.

The guide member 720 is provided inside the space surrounded by the side surfaces 711, 712, 713, and 714 so as to surround the periphery of the lead member 730. The guide member 720 is a dust core-based material, and magnetic particles of a metal alloy are used. Specifically, the inductor L1 in the present embodiment is a metal alloy type inductance element in which the guide member 720 and the lead member 730 made of a mixture of magnetic particles of a metal alloy and a binder are integrally molded. In other words, the metal alloy type inductance element is formed by inserting the lead member 730 into the mold, inserting the guide member 720 as the measured core material, and pressing with a high pressure. Unlike the ferrite core type inductance element, the guide member 720 formed of such a metal alloy type is not separated into, for example, an E type core and an I type core, and thus, it is not necessary to adhere the cores to each other. Therefore, the concern that leakage flux is generated between the cores can be reduced. Furthermore, in the metal alloy type inductance element, the selection range of materials that can be used as the guide member 720 is wide, and accordingly, an inductance element that has a relatively small size and capable of allowing a large current to flow, can be realized.

Next, a specific example of the shape of the lead member 730 will be described with reference to FIG. 12. Here, FIG. 12 illustrates a virtual straight line α that connects the terminal 741 and the terminal 742 to each other, and illustrates a point where the distance from the terminal 741 and the distance from the terminal 742 are equal to each other as a middle point CPα, on the virtual straight line α. In other words, in FIG. 12, the middle point CPa corresponds to the center point of the virtual straight line α.

As illustrated in FIG. 12, the lead member 730 has one end electrically coupled to the terminal 741 and the other end electrically coupled to the terminal 742, and includes a refraction point 734 and a refraction point 735. In the following description, among the lead members 730, the lead section positioned between the terminal 741 and the refraction point 734 is referred to as a lead wire 731, the lead section positioned between the refraction point 734 and the refraction point 735 is referred to as a lead wire 732, and the lead section positioned between the refraction point 735 and the terminal 742 is referred to as a lead wire 733. In other words, the lead member 730 includes the lead wires 731, 732, and 733, and is electrically coupled to the terminal 741 and the terminal 742 via the refraction points 734 and 735. In other words, the refraction point 734 and the refraction point 735 are positioned in order of the refraction point 734 and the refraction point 735 from the terminal 741 toward the terminal 742 along the lead member 730.

The refraction point 734 is positioned on the side surface 714 side of the virtual straight line α, and is positioned closer to the terminal 742 than the terminal 741. In other words, the refraction point 734 is positioned such that the shortest distance between the refraction point 734 and the terminal 742 is shorter than the shortest distance between the refraction point 734 and the terminal 741.

Among the lead members 730, the lead wire 731 positioned between the terminal 741 and the refraction point 734 is positioned on the side surface 714 side of the virtual straight line α, and electrically couples the terminal 741 and the refraction point 734 to each other. The lead wire 731 has a shape curved toward the side surface 714 so as to be separated from the middle point CPα.

The refraction point 735 is positioned on the side surface 713 side of the virtual straight line α, and is positioned closer to the terminal 741 than the terminal 742. In other words, the refraction point 735 is positioned such that the shortest distance between the refraction point 735 and the terminal 741 is shorter than the shortest distance between the refraction point 735 and the terminal 742.

Among the lead members 730, the lead wire 733 positioned between the terminal 742 and the refraction point 735 is positioned on the side surface 713 side of the virtual straight line α, and electrically couples the terminal 742 and the refraction point 735 to each other. The lead wire 733 has a shape curved toward the side surface 713 so as to be separated from the middle point CPα.

Among the lead members 730, the lead wire 732 positioned between the refraction point 734 and the refraction point 735 electrically couples the refraction point 734 and the refraction point 735 to each other. The lead wire 732 is positioned such that at least a part thereof passes through the middle point CPα. In other words, in the direction intersecting with the direction from the side surface 711 toward the side surface 712, that is, in a plan view of the inductor L1, at least a part of the lead wire 732 positioned between the refraction point 734 and the refraction point 735 in the lead member 730, and the virtual straight line α that connects the terminal 741 and the terminal 742, intersect with each other at the middle point CPa where the distances to the terminal 741 and the terminal 742 are equal to each other on the virtual straight line α.

As described above, in a plan view of the inductor L1, the lead member 730 in the present embodiment has a zigzag shape and has a substantially S shape as illustrated in FIG. 12, for example. In the inductor L1, for example, when a current is supplied in the direction from the terminal 741 toward the terminal 742, focusing on the lead wires 731 and 732 in the lead member 730, the current flows counterclockwise in FIG. 12. Therefore, a magnetic field is generated inside the annular lead section configured with the lead wires 731 and 732 in the lead member 730 in the direction from the back surface toward the front surface of the paper surface of FIG. 12. Meanwhile, focusing on the lead wires 732 and 733 in the lead member 730, the current flows clockwise in FIG. 12. Therefore, a magnetic field is generated inside the annular lead section configured with the lead wires 732 and 733 in the lead member 730 in the direction from the front surface toward the back surface of the paper surface.

In other words, since the lead member 730 has a substantially S shape in a plan view of the inductor L1, the inductor L1 has a coil formed by the lead wires 731 and 732 in the lead member 730 and a coil formed by the lead wires 732 and 733 in the lead member 730. Then, the direction of the magnetic field generated inside the coil formed by the lead wires 731 and 732 in the lead member 730 and the direction of the magnetic field generated inside the coil formed by the lead wires 732 and 733 in the lead member 730, are reverse to each other. In other words, the inductor L1 has a coil formed including the terminal 741 and the refraction points 734 and 735, and a coil formed including the terminal 742 and the refraction points 734 and 735, and the direction of the magnetic field generated by the coil formed including the terminal 741 and the refraction points 734 and 735 and the direction of the magnetic field generated by the coil formed including the terminal 742 and the refraction points 734 and 735 are different from each other.

Here, while a magnetic field is generated in the direction from the back surface toward the front surface of the paper surface inside the annular lead section configured with the lead wires 731 and 732 in the lead member 730, a magnetic field is generated in the direction from the front surface toward the back surface of the paper surface outside the annular lead section. Here, while a magnetic field is generated in the direction from the front surface toward the back surface of the paper surface inside the annular lead section configured with the lead wires 732 and 733 in the lead member 730, a magnetic field is generated in the direction from the back surface toward the front surface of the paper surface outside the annular lead section. In other words, in the inductor L1, the magnetic field generated by the coil formed by the lead wires 731 and 732 and the magnetic field generated by the coil formed by the lead wires 732 and 733 overlap each other, and as a result, the inductor L1 can obtain a large inductance value.

As described above, the inductor L1 of the driving signal output circuit 51 has the substantially S-shaped lead member 730 formed by processing a flat plate and the guide member 720 disposed so as to surround the periphery of the lead member 730. Since the lead member 730 is made of a flat plate, even when a large current is supplied to the inductor L1, the concern that the current density in the lead member 730 becomes excessive is reduced, and as a result, the heat generation of the lead member 730 is reduced. Therefore, the concern that magnetic saturation occurs in the inductor L1 is reduced. Furthermore, since the guide member 720 is disposed so as to surround the periphery of the lead member 730, it is possible to increase the effective cross-sectional area of the guide member 720 in the inductor L1, and as a result, a concern that magnetic saturation occurs in the inductor L1 is reduced. Furthermore, since the inductor L1 is made of a metal alloy type, the selection range of materials of the guide member 720 is wide, the inductor L1 has a relatively small size and is capable of allowing a large current to flow, and the concern that magnetic saturation occurs in the inductor L1 is reduced.

In other words, in the driving signal output circuit 51 of the present embodiment, by using the inductor L1 of the smoothing circuit 560 and using the inductance element having a structure illustrated in FIGS. 11 and 12, the concern that magnetic saturation occurs in the inductor L1 is reduced. Therefore, even when the amount of current flowing through the inductor L1 of the driving signal output circuit 51 increases due to the increase in the number of nozzles of the liquid discharge apparatus 1, the concern that the waveform accuracy of the driving signal COM output by the driving signal output circuit 51 deteriorates is reduced.

6. Configuration of Circuit Substrate Provided with Driving Signal Output Circuit As described above, in the driving signal output circuit 51 of the present embodiment, since the lead member 730 of the inductor L1 has a winding zigzag shape and a substantially S shape, the concern that magnetic saturation occurs in the inductor L1 can be reduced. Meanwhile, since the lead member 730 of the inductor L1 has a winding zigzag shape and a substantially S shape, as illustrated in FIG. 12, a gap is generated at a part of the lead member 730 between the terminal 741 and the refraction point 735 or between the terminal 742 and the refraction point 734, and as a result, there is a concern that leakage flux increases in the inductor L1. When the leakage flux generated by the inductor L1 interferes with various circuit elements of the driving signal output circuit 51, there is a concern that malfunction occurs in the circuit elements. When the noise generated by the operation of various circuit elements of the driving signal output circuit 51 interferes with the leakage flux generated by the inductor L1, the magnetic field generated by the inductor L1 is disturbed, and as a result, there is a concern that distortion occurs in the waveform of the driving signal COM output by the driving signal output circuit 51. In other words, in the driving signal output circuit 51, the lead member 730 uses the substantially S-shaped inductor L1 having a winding zigzag shape, and accordingly, the concern that magnetic saturation occurs in the inductor L1 can be reduced. However, from the viewpoint of improving the operational stability of the driving signal output circuit 51, there is room for improvement, and specifically, it is required to provide the various circuit elements of the driving signal output circuit 51 at a position that is not easily affected by the leakage flux generated by the inductor L1.

Figure 13:
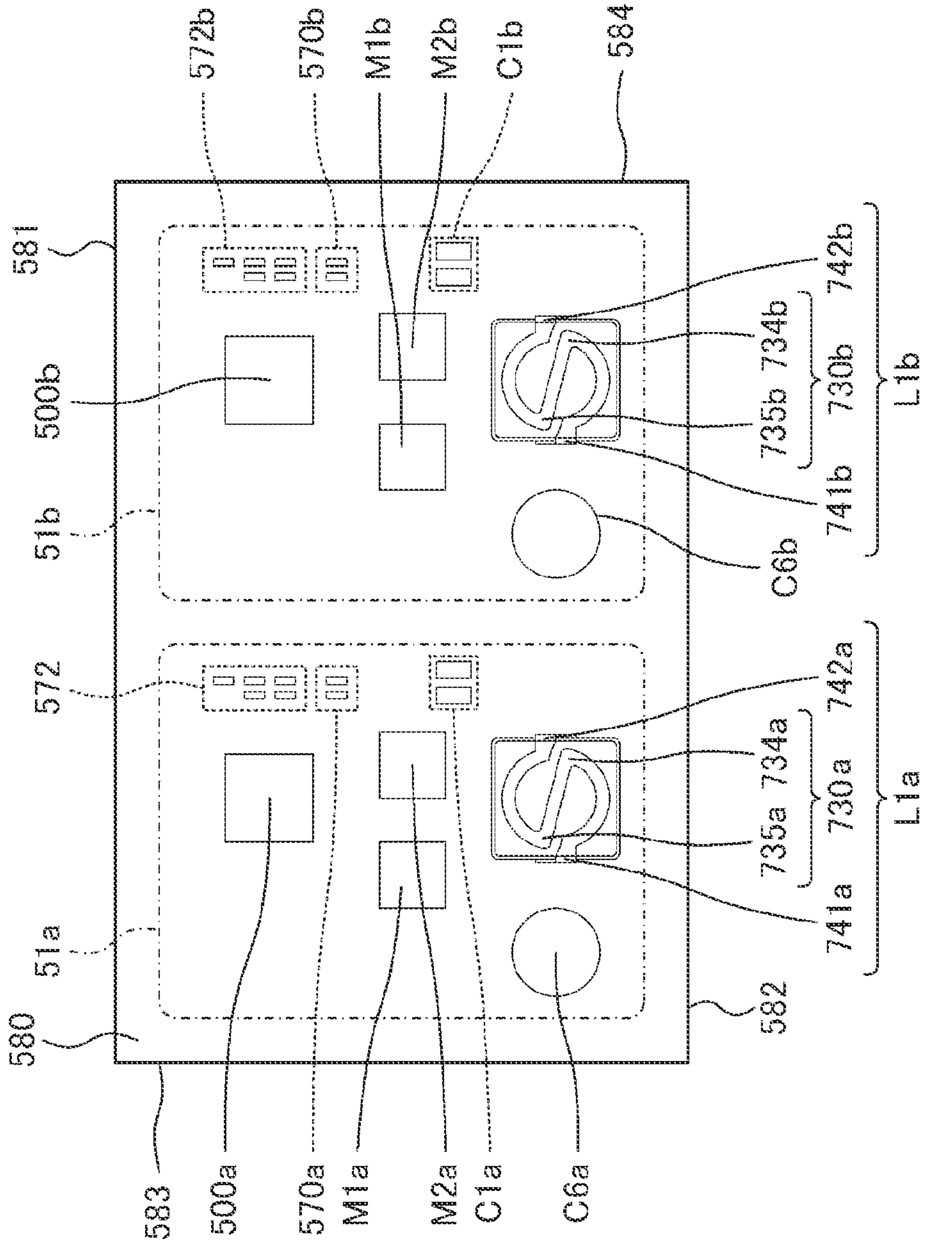
FIG. 13 is a view illustrating an example of arrangement of various circuit elements of the driving signal output circuit.

Here, the arrangement of various circuit elements in the driving signal output circuit 51 will be described with reference to FIG. 13, in which the concern that the operational stability of the driving signal output circuit 51 deteriorates can be reduced even when the lead member 730 uses the substantially S-shaped inductor L1 having a winding zigzag shape. FIG. 13 is a view illustrating an example of arrangement of various circuit elements of the driving signal output circuits 51*a* and 51*b*.

Here, in the following description, the integrated circuit 500 included in the driving signal output circuit 51*a* is referred to as an integrated circuit 500*a*, the transistors M1 and M2 are referred to as transistors M1*a* and M2*a*, the capacitors C1 and C6 are referred to as capacitors C1*a* and C6*a*, the feedback circuits 570 and 572 are referred to as feedback circuits 570*a* and 572*a*, and the inductor L1 is referred to as an inductor L1*a*. The support member 710 included in the inductor L1*a* is referred to as a support member 710*a*, the guide member 720 is referred to as a guide member 720*a*, the lead member 730 is referred to as a lead member 730*a*, and the terminals 741 and 742 are referred to as terminals 741*a* and 742*a*. The side surfaces 711, 712, 713, and 714 included in the support member 710*a* are referred to as side surfaces 711*a*, 712*a*, 713*a*, and 714*a*, the lead wires 731, 732, and 733 of the lead member 730*a* are referred to as lead wires 731*a*, 732*a*, and 733*a*, and the refraction points 734 and 735 are referred to as refraction points 734*a* and 735*a*. The inductor L1*a* will be described on the assumption that the amplified modulated signal AMs is input to the terminal 741*a* and the driving signal COMA is output from the terminal 742*a*.

Similarly, the integrated circuit 500 included in the driving signal output circuit 51*b* is referred to as an integrated circuit 500*b*, the transistors M1 and M2 are referred to as transistors M1*b* and M2*b*, the capacitors C1 and C6 are referred to as capacitors C1*b* and C6*b*, the feedback circuits 570 and 572 are referred to as feedback circuits 570*b* and 572*b*, and the inductor L1 is referred to as an inductor L1*b*. The support member 710 included in the inductor L1*b* is referred to as a support member 710*b*, the guide member 720 is referred to as a guide member 720*b*, the lead member 730 is referred to as a lead member 730*b*, and the terminals 741 and 742 are referred to as terminals 741*b* and 742*b*. The side surfaces 711, 712, 713, and 714 included in the support member 710*b* are referred to as side surfaces 711*b*, 712*b*, 713*b*, and 714*b*, the lead wires 731, 732, and 733 of the lead member 730*b* are referred to as lead wires 731*b*, 732*b*, and 733*b*, and the refraction points 734 and 735 are referred to as refraction points 734*b* and 735*b*. The inductor L1*b* will be described on the assumption that the amplified modulated signal AMs is input to the terminal 741*b* and the driving signal COMB is output from the terminal 742*b*.

As illustrated in FIG. 13, the driving signal output circuits 51*a* and 51*b* are mounted on a substrate 580. The substrate 580 has a substantially rectangular shape including a side 581; a side 582 positioned facing the side 581; a side 583 intersecting with both sides 581 and 582; and a side 584 positioned facing the side 583. The shape of the substrate 580 is not limited to a rectangular shape. FIG. 13 illustrates a case where only the driving signal output circuits 51*a* and 51*b* are mounted on the substrate 580, but various circuits may be mounted on the substrate 580 in addition to the driving signal output circuits 51*a* and 51*b*.

On the substrate 580, the driving signal output circuit 51*a* and the driving signal output circuit 51*b* are positioned side by side in order of the driving signal output circuit 51*a* and the driving signal output circuit 51*b* from the side 581 toward the side 582 along the side 583.

In the inductor L1*a* of the driving signal output circuit 51*a*, the terminals 741*a* and 742*a* are positioned in order of the terminal 741*a* and the terminal 742*a* along the direction from the side 583 toward the side 584 along the side 582 of the substrate 580. In other words, the inductor L1*a* is provided on the substrate 580 such that the side surface 711*a* provided with the terminal 741*a* is positioned on the side 583 side of the substrate 580, the side surface 712*a* provided with the terminal 742*a* is positioned on the side 584 side of the substrate 580, the side surface 713*a* intersecting with both the side surfaces 711*a* and 712*a* is positioned on the side 581 side of the substrate 580, and the side surface 714*a* positioned facing the side surface 713*a* is positioned on the side 582 side of the substrate 580. In other words, the inductor L1*a* is positioned such that the side surface 711*a* extends along the side 583 of the substrate 580, the side surface 712*a* extends along the side 584 of the substrate 580, the side surface 713*a* extends along the side 581 of the substrate 580, and the side surface 714*a* extends along the side 582 of the substrate 580.

The transistors M1*a* and M2*a* are positioned side by side in the direction along the side 582 such that the transistor M1*a* is on the side 583 side and the transistor M2*a* is on the side 584 side, on the side 581 side from the side surface 713*a* of the inductor L1*a*. In other words, the transistor M1*a* is provided on the substrate 580 such that the shortest distance between the transistor M1*a* and the side surface 713*a* is equal to or shorter than the shortest distance between the transistor M1*a* and the side surface 711*a*, and the shortest distance between the transistor M1*a* and the side surface 713*a* is equal to or shorter than the shortest distance between the transistor M1*a* and the side surface 712*a*. The transistor M2*a* is provided on the substrate 580 such that the shortest distance between the transistor M2*a* and the side surface 713*a* is equal to or shorter than the shortest distance between the transistor M2*a* and the side surface 711*a*, and the shortest distance between the transistor M2*a* and the side surface 713*a* is equal to or shorter than the shortest distance between the transistor M2*a* and the side surface 712*a*.

The integrated circuit 500*a* is positioned on the side 581 side from the side surface 713*a* of the inductor L1*a*, and on the side 581 side of the transistors M1*a* and M2*a* which are positioned side by side in the direction along the side 582. In other words, the integrated circuit 500*a* is provided on the substrate 580 such that the shortest distance between the integrated circuit 500*a* and the side surface 713*a* is equal to or shorter than the shortest distance between the integrated circuit 500*a* and the side surface 711*a*, and the shortest distance between the integrated circuit 500*a* and the side surface 713*a* is equal to or shorter than the shortest distance between the integrated circuit 500*a* and the side surface 712*a*.

As described above, the inductor L1*a*, the transistors M1*a* and M2*a*, and the integrated circuit 500*a* of the driving signal output circuit 51*a* are positioned in order of the inductor L1*a*, the transistors M1*a* and M2*a*, and the integrated circuit 500*a* along the direction from the side 582 toward the side 581, on the substrate 580. In other words, the inductor L1*a*, the transistors M1*a* and M2*a*, and the integrated circuit 500*a* are positioned in order of the inductor L1*a*, the transistors M1*a* and M2*a*, and the integrated circuit 500*a* along the direction intersecting with the side surface 713*a*.

The capacitor C6*a* electrically coupled to the propagation path through which the voltage VHV, which is the power source voltage supplied to the amplifier circuit 550*a*, propagates is positioned on the side 583 side from the side surface 711*a* of the inductor L1*a*. In other words, the capacitor C6*a* is provided on the substrate 580 such that the shortest distance between the capacitor C6*a* and the side surface 711*a* is equal to or shorter than the shortest distance between the capacitor C6*a* and the side surface 713*a*, and the shortest distance between the capacitor C6*a* and the side surface 711*a* is equal to or shorter than the shortest distance between the capacitor C6*a* and the side surface 714*a*.

The feedback circuit 572*a* is positioned on the side 584 side of the integrated circuit 500*a*. The feedback circuit 570*a* is positioned on the side 584 side of the integrated circuit 500*a* and on the side 582 side of the feedback circuit 572*a*. The capacitor C1*a* is positioned on the side 584 side of the transistors M1*a* and M2*a* and on the side 582 side of the feedback circuit 572*a*.

In the inductor L1*b* of the driving signal output circuit 51*b*, the terminals 741*b* and 742*b* are positioned in order of the terminal 741*b* and the terminal 742*b* along the direction from the side 583 toward the side 584 along the side 582 of the substrate 580. In other words, the inductor L1*b* is provided on the substrate 580 such that the side surface 711*b* provided with the terminal 741*b* is positioned on the side 583 side of the substrate 580, the side surface 712*b* provided with the terminal 742*b* is positioned on the side 584 side of the substrate 580, the side surface 713*b* intersecting with both the side surfaces 711*b* and 712*b* is positioned on the side 581 side of the substrate 580, and the side surface 714*b* positioned facing the side surface 713*b* is positioned on the side 582 side of the substrate 580. In other words, the inductor L1*b* is positioned such that the side surface 711*b* extends along the side 583 of the substrate 580, the side surface 712*b* extends along the side 584 of the substrate 580, the side surface 713*b* extends along the side 581 of the substrate 580, and the side surface 714*b* extends along the side 582 of the substrate 580.

The transistors M1*b* and M2*b* are positioned side by side in the direction along the side 582 such that the transistor M1*b* is on the side 583 side and the transistor M2*b* is on the side 584 side, on the side 581 side from the side surface 713*b* of the inductor L1*b*. In other words, the transistor M1*b* is provided on the substrate 580 such that the shortest distance between the transistor M1*b* and the side surface 713*b* is equal to or shorter than the shortest distance between the transistor M1*b* and the side surface 711*b*, and the shortest distance between the transistor M1*b* and the side surface 713*b* is equal to or shorter than the shortest distance between the transistor M1*b* and the side surface 712*b*. The transistor M2*b* is provided on the substrate 580 such that the shortest distance between the transistor M2*b* and the side surface

713*b* is equal to or shorter than the shortest distance between the transistor M2*b* and the side surface 711*b*, and the shortest distance between the transistor M2*b* and the side surface 713*b* is equal to or shorter than the shortest distance between the transistor M2*b* and the side surface 712*b*.

The integrated circuit 500*b* is positioned on the side 581 side from the side surface 713*b* of the inductor L1*b*, and on the side 581 side of the transistors M1*b* and M2*b* which are positioned side by side in the direction along the side 582. In other words, the integrated circuit 500*b* is provided on the substrate 580 such that the shortest distance between the integrated circuit 500*b* and the side surface 713*b* is equal to or shorter than the shortest distance between the integrated circuit 500*b* and the side surface 711*b*, and the shortest distance between the integrated circuit 500*b* and the side surface 713*b* is equal to or shorter than the shortest distance between the integrated circuit 500*b* and the side surface 712*b*.

As described above, the inductor L1*b*, the transistors M1*b* and M2*b*, and the integrated circuit 500*b* of the driving signal output circuit 51*b* are positioned in order of the inductor L1*b*, the transistors M1*b* and M2*b*, and the integrated circuit 500*b* along the direction from the side 582 toward the side 581, on the substrate 580. In other words, the inductor L1*b*, the transistors M1*b* and M2*b*, and the integrated circuit 500*b* are positioned in order of the inductor L1*b*, the transistors M1*b* and M2*b*, and the integrated circuit 500*b* along the direction intersecting with the side surface 713*b*.

The capacitor C6*b* electrically coupled to the propagation path through which the voltage VHV, which is the power source voltage supplied to the amplifier circuit 550*b*, propagates is positioned on the side 583 side from the side surface 711*b* of the inductor L1*b*. In other words, the capacitor C6*b* is provided on the substrate 580 such that the shortest distance between the capacitor C6*b* and the side surface 711*b* is equal to or shorter than the shortest distance between the capacitor C6*b* and the side surface 713*b*, and the shortest distance between the capacitor C6*b* and the side surface 711*b* is equal to or shorter than the shortest distance between the capacitor C6*b* and the side surface 714*b*.

The feedback circuit 572*b* is positioned on the side 584 side of the integrated circuit 500*b*. The feedback circuit 570*b* is positioned on the side 584 side of the integrated circuit 500*b* and on the side 582 side of the feedback circuit 572*b*. The capacitor C1*b* is positioned on the side 584 side of the transistors M1*b* and M2*b* and on the side 582 side of the feedback circuit 572*b*.

In this case, the inductor L1*a* and the inductor L1*b* are positioned side by side in the direction from the side 583 toward the side 584 of the substrate 580, that is, in the direction in which the side surface 711*a*, the side surface 712*a*, the side surface 711*b*, and the side surface 712*b* face each other, the transistors M1*a* and M2*a* and the transistors M1*b* and M2*b* are positioned side by side in the direction from the side 583 toward the side 584 of the substrate 580, that is, in the direction in which the side surface 711*a*, the side surface 712*a*, the side surface 711*b*, and the side surface 712*b* face each other, and the integrated circuit 500*a* and the integrated circuit 500*b* are positioned side by side in the direction from the side 583 toward the side 584 of the substrate 580, that is, in the direction in which the side surface 711*a*, the side surface 712*a*, the side surface 711*b*, and the side surface 712*b* face each other.

Furthermore, the driving signal output circuits 51*a* and 51*b* are positioned facing each other in the direction in which the terminal 742*a*, from which the driving signal COMA included in the inductor L1*a* of the driving signal output circuit 51*a* is output, and the terminal 741*b*, into which the amplified modulated signal AMs included in the inductor L1*b* of the driving signal output circuit 51*b* is input, face from the side 583 toward the side 584, on the substrate 580. In other words, the inductor L1*a* and the inductor L1*b* are positioned such that the side surface 712*a* provided with the terminal 742*a* and the side surface 711*b* provided with the terminal 741*b* face each other.

Here, as described above, when a current flows in the inductor L1 in the direction from the terminal 741 toward the terminal 742, that is, when the amplified modulated signal AMs is supplied to the terminal 741 and the driving signal COM is output from the terminal 742, a magnetic field in the opposite direction is generated between the coil formed including the terminal 741 and the refraction points 734 and 735 and the coil formed including the terminal 742 and the refraction points 734 and 735. Therefore, a magnetic field in the opposite direction is generated to be close to the terminal 741, that is, outside the inductor L1, and to be close to the terminal 742, that is, outside the inductor L1. In other words, as illustrated in FIG. 13, the inductor L1*a* and the inductor L1*b* are positioned such that the side surface 712*a* provided with the terminal 742*a* and the side surface 711*b* provided with the terminal 741*b* face each other, and accordingly, the magnetic field generated in the region between the inductor L1*a* and the inductor L1*b* is canceled out. As a result, the concern that the magnetic field generated by the inductors L1*a* and L1*b* will affect the region between the inductor L1*a* and the inductor L1*b* is reduced. Accordingly, the concern that the magnetic field generated by the inductors L1*a* and L1*b* contributes to the circuit element provided in the region between the inductor L1*a* and the inductor L1*b* is reduced, and as a result, the concern that malfunction occurs in the circuit element is reduced.

Furthermore, by canceling out the magnetic field generated in the region between the inductor L1*a* and the inductor L1*b*, it is possible to arrange the circuit elements of the driving signal output circuits 51*a* and 51*b* in the region between the inductor L1*a* and the inductor L1*b*. As a result, the degree of freedom in arranging the circuit elements of each of the driving signal output circuits 51*a* and 51*b* on the substrate 580 is improved, and the substrate 580 provided with the driving signal output circuits 51*a* and 51*b* can be miniaturized.

Furthermore, in this case, it is preferable that at least one of the capacitor C6*a* of the driving signal output circuit 51*a* and the capacitor C6*b* of the driving signal output circuit 51*b* is positioned in the region between the inductor L1*a* and the inductor L1*b*. In other words, at least one of the capacitor C6*a* of the driving signal output circuit 51*a* and the capacitor C6*b* of the driving signal output circuit 51*b* is positioned between the inductor L1*a* and the inductor L1*b*. Accordingly, the capacitors C6*a* and C6*b* function as shield members for reducing mutual interference between the inductor L1*a* of the driving signal output circuit 51*a* and the inductor L1*b* of the driving signal output circuit 51*b*. As a result, the concern that the magnetic field generated by the inductor L1*a* interferes with the driving signal output circuit 51*b* is reduced, and the concern that the magnetic field generated by the inductor L1*b* interferes with the driving signal output circuit 51*a* is reduced. Accordingly, on the substrate 580, the distance between the driving signal output circuit 51*a* and the driving signal output circuit 51*b* can be reduced, and as a result, the substrate 580 provided with the driving signal output circuits 51*a* and 51*b* can be miniaturized.

Here, the driving signal COMA is an example of a first driving signal, the driving signal COMB is an example of a second driving signal, the reference driving signal dA which is the reference of the driving signal COMA is an example of a first reference driving signal, and the reference driving signal dB which is the reference of the driving signal COMB is an example of a second reference driving signal. In addition, the discharge section 600 that includes the piezoelectric element 60 to which the driving signal VOUT having at least one of the trapezoidal waveforms Adp1 and Adp2 included in the driving signal COMA is supplied, and discharges ink by driving the piezoelectric element 60, is an example of a first discharge section, and the discharge section 600 that includes the piezoelectric element 60 to which the driving signal VOUT including at least one of the trapezoidal waveforms Bdp1 and Bdp2 included in the driving signal COMB is supplied, and discharges ink by driving the piezoelectric element 60 is an example of a second discharge section.

In addition, the integrated circuit 500*a* of the driving signal output circuit 51*a* is an example of a first integrated circuit, at least one of the amplification control signals Hgd and Lgd output by the integrated circuit 500*a* is an example of a first modulated signal, at least one of the transistors M1*a* and M2*a* is an example of a first transistor, the amplifier circuit 550*a* including the transistors M1*a* and M2*a* is an example of a first amplifier circuit, the amplified modulated signal AMs output by the amplifier circuit 550*a* is an example of a first amplified modulated signal, the inductor L1*a* is an example of a first inductance element, and the smoothing circuit 560*a* including the inductor L1*a* is an example of a first demodulation circuit.

In addition, the integrated circuit 500*b* of the driving signal output circuit 51*b* is an example of a second integrated circuit, at least one of the amplification control signals Hgd and Lgd output by the integrated circuit 500*b* is an example of a second modulated signal, at least one of the transistors M1*b* and M2*b* is an example of a second transistor, the amplifier circuit 550*b* including the transistors M1*b* and M2*b* is an example of a second amplifier circuit, the amplified modulated signal AMs output by the amplifier circuit 550*b* is an example of a second amplified modulated signal, the inductor L1*b* is an example of a second inductance element, and the smoothing circuit 560*b* including the inductor L1*b* is an example of a second demodulation circuit.

In addition, in the inductor L1*a*, the support member 710*a* is an example of a first housing, the side surface 711*a* is an example of a first side portion, the side surface 712*a* is an example of a second side portion, the side surface 713*a* is an example of a third side portion, the terminal 741*a* provided on the side surface 711*a* is an example of a first terminal, the terminal 742*a* provided on the side surface 712*a* is an example of a second terminal, the guide member 720*a* is an example of a first guide member, the lead member 730*a* is an example of a first lead member, the refraction point 734*a* is an example of a first refraction point, the refraction point 735*a* is an example of a second refraction point, the lead wire 732*a* is an example of a first lead section, the virtual straight line α that connects the terminal 741*a* and the terminal 742*a* is an example of a first virtual straight line, and the middle point CPa of the virtual straight line α that corresponds to the first virtual straight line is an example of a first center portion. Further, in the inductor L1*a*, the coil formed by the lead wire 731*a* and the lead wire 732*a* is an example of a first coil, and the coil formed by the lead wire 732*a* and the lead wire 733*a* is an example of a second coil.

In addition, in the inductor L1*b*, the support member 710*b* is an example of a second housing, the side surface 711*b* is an example of a fourth side portion, the side surface 712*b* is an example of a fifth side portion, the side surface 713*b* is an example of a sixth side portion, the terminal 741*b* provided on the side surface 711*b* is an example of a third terminal, the terminal 742*b* provided on the side surface 712*b* is an example of a fourth terminal, the guide member 720*b* is an example of a second guide member, the lead member 730*b* is an example of a second lead member, the refraction point 734*b* is an example of a third refraction point, the refraction point 735*b* is an example of a fourth refraction point, the lead wire 732*b* is an example of a second lead section, the virtual straight line α that connects the terminal 741*b* and the terminal 742*b* is an example of a second virtual straight line, and the middle point CPa of the virtual straight line α that corresponds to the second virtual straight line is an example of a second center portion. Further, in the inductor L1*b*, the coil formed by the lead wire 731*b* and the lead wire 732*b* is an example of a third coil, and the coil formed by the lead wire 732*b* and the lead wire 733*b* is an example of a fourth coil.

In addition, the capacitor C6*b* of the driving signal output circuit 51*b* is an example of a capacitive element.

7. Operational Effect

In the liquid discharge apparatus 1 configured as described above, the inductor L1*a* of the smoothing circuit 560*a* that outputs the driving signal COMA by demodulating the amplified modulated signal AMs includes the terminal 741*a* which is provided on the side surface 711*a*, and into which the amplified modulated signal AMs is input; the terminal 742*a* which is provided on the side surface 712*a* positioned facing the side surface 711*a*, and from which the driving signal COMA is output; the lead member 730*a* which has one end coupled to the terminal 741*a* and the other end coupled to the terminal 742*a*, and includes the refraction point 734*a* and the refraction point 735*a*; and the guide member 720*a* provided so as to surround at least a part of the lead member 730*a*.

In addition, in the direction intersecting with the direction from the side surface 711*a* toward the side surface 712*b* of the inductor L1*a*, at least a part of the lead wire 732*a* positioned between the refraction point 734*a* and the refraction point 735*a* in the lead member 730*a*, and the virtual straight line α that connects the terminal 741*a* and the terminal 742*a*, intersect with each other at the middle point CPa where the distances to the terminal 741*a* and the terminal 742*a* are equal to each other on the virtual straight line α. In addition, the inductor L1*b* of the smoothing circuit 560*b* that outputs the driving signal COMB by demodulating the amplified modulated signal AMs includes the terminal 741*b* which is provided on the side surface 711*b*, and into which the amplified modulated signal AMs is input; the terminal 742*b* which is provided on the side surface 712*b* positioned facing the side surface 711*b*, and from which the driving signal COMB is output; the lead member 730*b* which has one end coupled to the terminal 741*b* and the other end coupled to the terminal 742*b*, and includes the refraction point 734*b* and the refraction point 735*b*; and the guide member 720*b* provided so as to surround at least a part of the lead member 730*a*. In addition, in the direction intersecting with the direction from the side surface 711*b* toward the side surface 712*b* of the inductor L1*b*, at least a part of the lead wire 732*b* positioned between the refraction point 734*b* and the refraction point 735*b* in the lead member 730*b*, and the virtual straight line α that connects the terminal 741*b* and the terminal 742*b*, intersect with each other at the middle point CPa where the distances to the terminal 741*b* and the terminal 742*b* are equal to each other on the virtual straight line α.

Since such inductors L1*a* and L1*b* can increase the cross-sectional areas of each of the lead members 730*a* and 730*b*, the current density can be reduced, and accordingly, the heat generation of the lead members 730*a* and 730*b* can be reduced. In addition, since the guide member 720*a* is provided so as to cover the lead member 730*a* and the guide member 720*b* is provided so as to cover the lead member 730*b*, the effective cross-sectional area of the guide members 720*a* and 720*b* can be increased. Accordingly, even when the number of discharge sections 600 that discharge ink increases and the amount of current output by the driving signal output circuits 51*a* and 51*b* increases, the concern that magnetic saturation occurs in the inductors L1*a* and L1*b* can be reduced. Therefore, even when the number of discharge sections 600 that discharge ink increases and the amount of current output by the driving signal output circuits 51*a* and 51*b* increases, the concern that distortion occurs in the waveforms of each of the driving signal COMA output by the driving signal output circuit 51*a* and the driving signal COMB output by the driving signal output circuit 51*b* is reduced, and as a result, the concern that ink discharge characteristics of the liquid discharge apparatus 1 deteriorate is reduced.

Furthermore, the side surface 712*a* provided with the terminal 742*a* of the inductor L1*a* and the side surface 711*b* provided with the terminal 741*b* of the inductor L1*b* are positioned facing each other, and accordingly, the magnetic field generated in the region between the inductor L1*a* and the inductor L1*b* is canceled out. Accordingly, the magnetic field generated by the inductors L1*a* and L1*b* is superimposed on the circuit element disposed in the region between the inductor L1*a* and the inductor L1*b*, and the concern that malfunction occurs in the circuit element is reduced. Accordingly, the concern that distortion occurs in the waveforms of each of the driving signal COMA output by the driving signal output circuit 51*a* and the driving signal COMB output by the driving signal output circuit 51*b* is reduced, and as a result, the concern that ink discharge characteristics of the liquid discharge apparatus 1 deteriorate is reduced.

In other words, in the liquid discharge apparatus 1 of the present embodiment, even when the amount of current output by the driving signal output circuits 51*a* and 51*b* increases, the concern that magnetic saturation occurs in the inductors L1*a* and L1*b* is reduced, and the concern that malfunction occurs in the circuit element of the driving signal output circuits 51*a* and 51*b* due to the magnetic field generated by the inductors L1*a* and L1*b* is reduced. As a result, the concern that distortion occurs in the waveforms of the driving signals COMA and COMB output by the driving signal output circuits 51*a* and 51*b* is reduced, and the concern that the ink discharge characteristics of the liquid discharge apparatus 1 deteriorate is reduced.

Furthermore, in the liquid discharge apparatus 1 of the present embodiment, in the inductor L1*a*, the refraction point 734*a* and the refraction point 735*a* are positioned in order of the refraction point 734*a* and the refraction point 735*a* from the terminal 741*a* toward the terminal 742*a* along the lead member 730*a*, the shortest distance between the refraction point 734*a* and the terminal 742*a* is shorter than the shortest distance between the refraction point 734*a* and the terminal 741*a*, and the shortest distance between the refraction point 735*a* and the terminal 741*a* is shorter than the shortest distance between the refraction point 735*a* and the terminal 742*a*. In addition, in the inductor L1*b*, the refraction point 734*b* and the refraction point 735*b* are positioned in order of the refraction point 734*b* and the refraction point 735*b* from the terminal 741*b* toward the terminal 742*b* along the lead member 730*b*, the shortest distance between the refraction point 734*b* and the terminal 742*b* is shorter than the shortest distance between the refraction point 734*b* and the terminal 741*b*, and the shortest distance between the refraction point 735*b* and the terminal 741*b* is shorter than the shortest distance between the refraction point 735*b* and the terminal 742*b*. Accordingly, the gap generated to be close to the terminals 741*a* and 742*a* of the inductor L1*a* and the gap generated to be close to the terminals 741*b* and 742*b* of the inductor L1*b* can be reduced. As a result, the leakage flux generated by the inductors L1*a* and L1*b* can be reduced, and the concern that the leakage flux affects the circuit elements of the driving signal output circuits 51*a* and 51*b* is further reduced. Accordingly, the concern that distortion occurs in the waveforms of the driving signals COMA and COMB output by the driving signal output circuits 51*a* and 51*b* is further reduced, and the concern that the ink discharge characteristics of the liquid discharge apparatus 1 deteriorate is further reduced.

8. Modification Example

In the above-described embodiment, the inductors L1*a* and L1*b* was described as being supported by the support member 710, respectively. However, when the inductors L1*a* and L1*b* are metal alloy type inductance elements, as described above, the inductors L1*a* and L1*b* are formed by inserting the lead members 730*a* and 730*b* into a mold, inserting the guide members 720*a* and 720*b* as measured core materials, and pressing with a high pressure. In other words, the guide members 720*a* and 720*b* of the inductors L1*a* and L1*b* are formed in a state of supporting the lead members 730*a* and 730*b*. In other words, when the inductors L1*a* and L1*b* are metal alloy type inductance elements, the inductors L1*a* and L1*b* do not have support members 710*a* and 710*b*, and the guide members 720*a* and 720*b* may respectively function as support members. Even when the inductors L1*a* and L1*b* have the above-described configuration, the same operational effect can be obtained.

In this case, as illustrated in FIG. 12, the guide member 720*a* of the inductor L1*a* is an example of a first housing, the side surface 721*a* of the guide member 720*a* is an example of a first side surface, the side surface 722*a* of the guide member 720*a* is an example of a second side surface, and the side surface 723*a* of the guide member 720*a* is an example of a third side surface. In addition, the guide member 720*b* of the inductor L1*b* is an example of a second housing, the side surface 721*a* of the guide member 720*b* is an example of a fourth side surface, the side surface 722*a* of the guide member 720*b* is an example of a fifth side surface, and the side surface 723*a* of the guide member 720*b* is an example of a sixth side surface.

In addition, in the above-described embodiment, the lead members 730*a* and 730*b* of the inductors L1*a* and L1*b* were described as having a substantially S shape, respectively. However, the shape of the lead member 730 is not limited to a substantially S shape, and the inductors L1*a* and L1*b* may have a substantially Z-shaped lead member 750 as illustrated in FIG. 14 instead of the lead members 730*a* and 730*b*.

Figure 14:
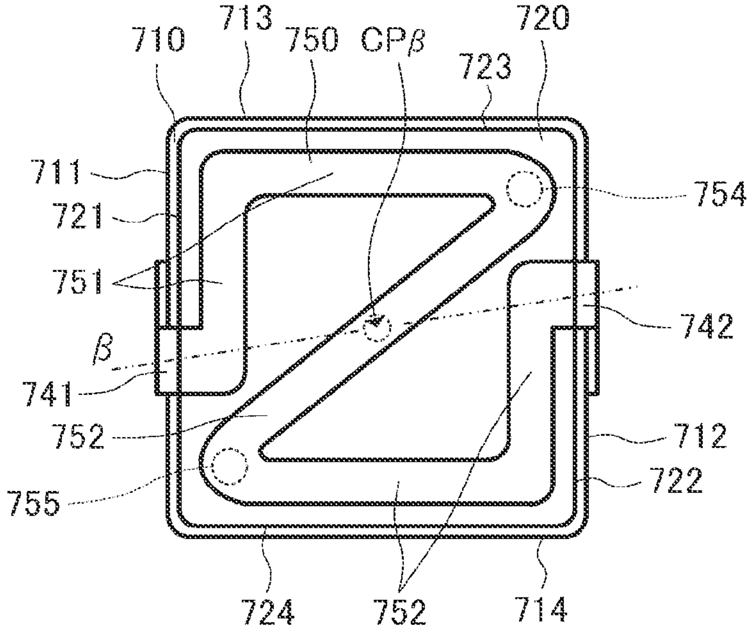
FIG. 14 is a view for describing an internal structure of an inductor according to a modification example.

FIG. 14 is a view for describing an internal structure of the inductors L1*a* and L1*b* according to the modification example. In FIG. 14, the inductors L1*a* and L1*b* are not distinguished and are simply referred to as the inductor L1. In FIG. 14, in describing the shape of the lead member 750 of the inductor L1, a part of the inductor L1 is made transparent and illustrated, and a virtual straight line β that connects the terminal 741 and the terminal 742 and a middle point CPβ in which the distance from the terminal 741 and the distance from the terminal 742 are equal to each other on the virtual straight line β, are illustrated.

As illustrated in FIG. 14, the lead member 750 has one end electrically coupled to the terminal 741 and the other end electrically coupled to the terminal 742, and includes a refraction point 754 and a refraction point 755. Here, among the lead members 750, the lead section positioned between the terminal 741 and the refraction point 754 is referred to as a lead wire 751, the lead section positioned between the refraction point 754 and the refraction point 755 is referred to as a lead wire 752, and the lead section positioned between the refraction point 755 and the terminal 742 is referred to as a lead wire 753.

The refraction point 754 is positioned on the side surface 713 side of the virtual straight line β, and is positioned closer to the terminal 742 than the terminal 741. In other words, the refraction point 754 is positioned such that the shortest distance between the refraction point 754 and the terminal 742 is shorter than the shortest distance between the refraction point 754 and the terminal 741.

Among the lead members 750, the lead wire 751 positioned between the terminal 741 and the refraction point 754 is positioned on the side surface 713 side of the virtual straight line β, and electrically couples the terminal 741 and the refraction point 754 to each other. The lead wire 751 makes a shape that extends from the terminal 741 along the side surface 711, bends toward the side surface 712 to be close to the intersection of the side surface 711 and the side surface 713, and then extends along the side surface 713.

The refraction point 755 is positioned on the side surface 714 side of the virtual straight line β, and is positioned closer to the terminal 741 than the terminal 742. In other words, the refraction point 755 is positioned such that the shortest distance between the refraction point 755 and the terminal 741 is shorter than the shortest distance between the refraction point 755 and the terminal 742.

Among the lead members 750, the lead wire 753 positioned between the terminal 742 and the refraction point 754 is positioned on the side surface 714 side of the virtual straight line β, and electrically couples the terminal 742 and the refraction point 755 to each other. The lead wire 753 makes a shape that extends from the terminal 742 along the side surface 712, bends toward the side surface 711 to be close to the intersection of the side surface 712 and the side surface 714, and then extends along the side surface 714.

Among the lead members 750, the lead wire 752 positioned between the refraction point 754 and the refraction point 755 electrically couples the refraction point 754 and the refraction point 755 to each other. The lead wire 752 is positioned such that at least a part thereof passes through the middle point CPβ. In other words, in the direction intersecting with the direction from the side surface 711 toward the side surface 712, that is, in a plan view of the inductor L1, at least a part of the lead wire 752 positioned between the refraction point 754 and the refraction point 755 in the lead member 750, and the virtual straight line β that connects the terminal 741 and the terminal 742, intersect with each other at the middle point CPβ where the distances to the terminal 741 and the terminal 742 are equal to each other on the virtual straight line β.

When the driving signal output circuits 51*a* and 51*b* include the inductor L1 configured as described above, the same operational effects as those in the above-described embodiment can be obtained.

Above, the embodiments and the modification examples were described above, but the present disclosure is not limited to the embodiments and the modification examples, and can be implemented in various modes without departing from the gist thereof. For example, the embodiments and the modification examples can also be appropriately combined with each other.

The present disclosure includes substantially the same configurations (for example, configurations having the same functions, methods, and results, or configurations having the same objects and effects) as the configurations described in the embodiments and the modification examples. Further, the present disclosure includes configurations in which non-essential parts of the configuration described in the embodiments and the modification examples are replaced. In addition, the present disclosure includes configurations that achieve the same operational effects or configurations that can achieve the same objects as those of the configurations described in the embodiments and the modification examples. Further, the present disclosure includes configurations in which a known technology is added to the configurations described in the embodiments and the modification examples.

The following contents are derived from the above-described embodiments and modification examples.

According to an aspect of the liquid discharge apparatus, there may be provided a first discharge section that discharges a liquid by supplying a first driving signal; a first integrated circuit that outputs a first modulated signal obtained by modulating a first reference driving signal that is a reference of the first driving signal; a first amplifier circuit that outputs a first amplified modulated signal by driving a first transistor driven by the first modulated signal; a first demodulation circuit that includes a first inductance element and outputs the first driving signal obtained by demodulating the first amplified modulated signal; a second discharge section that discharges the liquid by supplying a second driving signal; a second integrated circuit that outputs a second modulated signal obtained by modulating a second reference driving signal that is a reference of the second driving signal; a second amplifier circuit that outputs a second amplified modulated signal by driving a second transistor driven by the second modulated signal; and a second demodulation circuit that includes a second inductance element and outputs the second driving signal obtained by demodulating the second amplified modulated signal, the first inductance element may include a first housing having a first side portion, a second side portion positioned facing the first side portion, and a third side portion intersecting with the first side portion and the second side portion, a first terminal which is provided in the first side portion, and to which the first amplified modulated signal is input, a second terminal which is provided in the second side portion, and from which the first driving signal is output, a first lead member of which one end is coupled to the first terminal and the other end is coupled to the second terminal, and which has a first refraction point and a second refraction point and is provided inside the first housing, and a first guide member provided so as to surround at least a part of the first lead member, in a direction intersecting with a direction from the first side portion toward the second side portion, at least a part of the first lead section positioned between the first refraction point and the second refraction point in the first lead member and a first virtual straight line that connects the first terminal and the second terminal may intersect with each other at a first center portion where distances to the first terminal and the second terminal on the first virtual straight line are equal to each other, the second inductance element may include a second housing having a fourth side portion, a fifth side portion positioned facing the fourth side portion, and a sixth side portion intersecting with the fourth side portion and the fifth side portion, a third terminal which is provided in the fourth side portion, and to which the second amplified modulated signal is input, a fourth terminal which is provided in the fifth side portion, and from which the second driving signal is output, a second lead member of which one end is coupled to the third terminal and the other end is coupled to the fourth terminal, and which has a third refraction point and a fourth refraction point and is provided inside the second housing, and a second guide member provided so as to surround at least a part of the second lead member, in a direction intersecting with a direction from the fourth side portion toward the fifth side portion, at least a part of the second lead section positioned between the third refraction point and the fourth refraction point in the second lead member and a second virtual straight line that connects the third terminal and the fourth terminal may intersect with each other at a second center portion where distances to the first terminal and the second terminal on the second virtual straight line are equal to each other, and the first inductance element and the second inductance element may be positioned such that the second side portion and the fourth side portion face each other.

According to this liquid discharge apparatus, the first inductance element of the first demodulation circuit that outputs the first driving signal obtained by demodulating the first amplified modulated signal includes a first housing having a first side portion, a second side portion positioned facing the first side portion, and a third side portion intersecting with the first side portion and the second side portion, a first terminal which is provided in the first side portion, and to which the first amplified modulated signal is input, a second terminal which is provided in the second side portion, and from which the first driving signal is output, a first lead member of which one end is coupled to the first terminal and the other end is coupled to the second terminal, and which has a first refraction point and a second refraction point and is provided inside the first housing, and a first guide member provided so as to surround at least a part of the first lead member, in a direction intersecting with a direction from the first side portion toward the second side portion, at least a part of the first lead section positioned between the first refraction point and the second refraction point in the first lead member and a first virtual straight line that connects the first terminal and the second terminal intersect with each other at a first center portion where distances to the first terminal and the second terminal on the first virtual straight line are equal to each other, the second inductance element included in the second demodulation circuit that outputs the second driving signal obtained by demodulating the second amplified modulated signal includes a second housing having a fourth side portion, a fifth side portion positioned facing the fourth side portion, and a sixth side portion intersecting with the fourth side portion and the fifth side portion, a third terminal which is provided in the fourth side portion, and to which the second amplified modulated signal is input, a fourth terminal which is provided in the fifth side portion, and from which the second driving signal is output, a second lead member of which one end is coupled to the third terminal and the other end is coupled to the fourth terminal, and which has a third refraction point and a fourth refraction point and is provided inside the second housing, and a second guide member provided so as to surround at least a part of the second lead member, and in a direction intersecting with a direction from the fourth side portion toward the fifth side portion, at least a part of the second lead section positioned between the third refraction point and the fourth refraction point in the second lead member and a second virtual straight line that connects the third terminal and the fourth terminal intersect with each other at a second center portion where distances to the first terminal and the second terminal on the second virtual straight line are equal to each other. In such a first inductance element and a second inductance element, the cross-sectional area of the first lead member and the second lead member can be widened. Accordingly, the heat generation of the first lead member and the second lead member can be reduced, and the effective cross-sectional area of the first guide member and the second guide member can be increased. Accordingly, the concern that magnetic saturation occurs in the first inductance element and the second inductance element can be reduced.

In addition, by positioning the first inductance element and the second inductance element such that the second side portion provided with the second terminal, from which the first driving signal is output, and the fourth side portion provided with the fourth terminal, to which the second amplified modulated signal is input, face each other, the magnetic field between the first inductance element and the second inductance element is canceled out. As a result, even when the circuit element is provided between the first inductance element and the second inductance element, the concern that the magnetic field generated by the first inductance element and the second inductance element interfere with the circuit element and malfunction occurs in the circuit element is reduced. Accordingly, the operations of various circuits including the first integrated circuit, the first amplifier circuit, the first demodulation circuit, the second integrated circuit, the second amplifier circuit, and the second demodulation circuit are stabilized, and as a result, the waveform accuracy of the first driving signal and the second driving signal is improved.

According to the aspect of the liquid discharge apparatus, the first refraction point and the second refraction point may be positioned in order of the first refraction point and the second refraction point from the first terminal toward the second terminal along the first lead member, the third refraction point and the fourth refraction point may be positioned in order of the third refraction point and the fourth refraction point from the third terminal toward the fourth terminal along the second lead member, a shortest distance between the first refraction point and the second terminal may be shorter than a shortest distance between the first refraction point and the first terminal, a shortest distance between the second refraction point and the first terminal may be shorter than a shortest distance between the second refraction point and the second terminal, a shortest distance between the third refraction point and the fourth terminal may be shorter than a shortest distance between the third refraction point and the third terminal, and a shortest distance between the fourth refraction point and the third terminal may be shorter than a shortest distance between the fourth refraction point and the fourth terminal.

According to this liquid discharge apparatus, the gaps generated to be close to the first terminal and to be close to the second terminal can be reduced. Accordingly, the leakage flux leaking out of the first inductance element can be reduced, and as a result, the concern that the leakage flux leaking out of the first inductance element affects the operations of various circuit elements is reduced. Similarly, the gaps generated to be close to the third terminal and to be close to the fourth terminal can be reduced. Accordingly, the leakage flux leaking out of the second inductance element can be reduced, and as a result, the concern that the leakage flux leaking out of the second inductance element affects the operations of various circuit elements is reduced. Accordingly, the operations of various circuits including the first integrated circuit, the first amplifier circuit, the first demodulation circuit, the second integrated circuit, the second amplifier circuit, and the second demodulation circuit are further stabilized, and as a result, the waveform accuracy of the first driving signal and the second driving signal is further improved.

According to the aspect of the liquid discharge apparatus, the first inductance element may include a first coil having the first terminal, the first refraction point, and the second refraction point, and a second coil having the second terminal, the first refraction point, and the second refraction point, the second inductance element may include a third coil having the third terminal, the third refraction point, and the fourth refraction point, and a fourth coil having the third terminal, the third refraction point, and the fourth refraction point, when a current flows through the first lead member, a direction of a magnetic field generated in the first coil may be different from a direction of a magnetic field generated in the second coil, and when a current flows through the second lead member, a direction of a magnetic field generated in the third coil may be different from a direction of a magnetic field generated in the fourth coil.

According to this liquid discharge apparatus, since the first inductance element has the first coil and the second coil in which the directions of the magnetic fluxes are different, the first inductance element can obtain a larger inductance value. Similarly, since the second inductance element has the third coil and the fourth coil in which the directions of the magnetic fluxes are different, the second inductance element can obtain a larger inductance value. Accordingly, the concern that the inductance values of the first inductance element and the second inductance element decrease to the extent that affects the demodulation of the first amplified modulated signal and the second amplified modulated signal is reduced. Accordingly, the concern that magnetic saturation occurs in the first inductance element and the second inductance element can further be reduced.

According to the aspect of the liquid discharge apparatus, a capacitive element electrically coupled to a propagation path through which a power source voltage supplied to at least one of the first amplifier circuit and the second amplifier circuit propagates may further be provided, and the capacitive element may be positioned between the first inductance element and the second inductance element.

According to this liquid discharge apparatus, the magnetic field generated in the first inductance element and the magnetic field generated in the second inductance element are shielded by the capacitive element. As a result, the concern that the magnetic field generated in the first inductance element and the magnetic field generated in the second inductance element interfere with each other is further reduced. As a result, even when the circuit element is disposed between the first inductance element and the second inductance element, the concern that malfunction occurs in the circuit element is further reduced. Accordingly, the operations of various circuits including the first integrated circuit, the first amplifier circuit, the first demodulation circuit, the second integrated circuit, the second amplifier circuit, and the second demodulation circuit are stabilized, and as a result, the waveform accuracy of the first driving signal and the second driving signal is improved.

According to the aspect of the liquid discharge apparatus, the first inductance element, the first transistor, and the first integrated circuit may be positioned in order of the first inductance element, the first transistor, and the first integrated circuit along a direction intersecting with the third side portion, the second inductance element, the second transistor, and the second integrated circuit may be positioned in order of the second inductance element, the second transistor, and the second integrated circuit along a direction intersecting with the sixth side portion, and the first transistor and the second transistor may be positioned side by side, and the first integrated circuit and the second integrated circuit may be positioned side by side, along a direction in which the second side portion and the fifth side portion face each other.

According to this liquid discharge apparatus, the first integrated circuit that outputs the first modulated signal obtained by modulating the first reference driving signal that is the reference of the first driving signal, the first transistor included in the first amplifier circuit that outputs the first amplified modulated signal, and the first inductance element included in the first demodulation circuit that outputs the first driving signal obtained by demodulating the first amplified modulated signal are provided in order of the first inductance element, the first transistor, and the first integrated circuit, and the second integrated circuit that outputs the second modulated signal obtained by modulating the second reference driving signal that is the reference of the second driving signal, the second transistor included in the second amplifier circuit that outputs the second amplified modulated signal, and the second inductance element included in the second demodulation circuit that outputs the second driving signal obtained by demodulating the second amplified modulated signal are provided in order of the second inductance element, the second transistor, and the second integrated circuit. Accordingly, various circuit elements can be arranged along the flow of the signal that generates the first driving signal from the first reference driving signal and the flow of the signal that generates the second driving signal from the second reference driving signal. As a result, the concern that the first reference driving signal, the first modulated signal, the first amplified modulated signal, and the first driving signal interfere with each other is reduced, and the concern that the second reference driving signal, the second modulated signal, the second amplified modulated signal, and the second driving signal interfere with each other is reduced.

Furthermore, the first integrated circuit that outputs the first modulated signal obtained by modulating the first reference driving signal that is the reference of the first driving signal and the second integrated circuit that outputs the second modulated signal obtained by modulating the second reference driving signal that is the reference of the second driving signal are positioned side by side along the direction in which the second side portion and the fifth side portion face each other, the first transistor included in the first amplifier circuit that outputs the first amplified modulated signal and the second transistor included in the second amplifier circuit that outputs the second amplified modulated signal are positioned side by side along the direction in which the second side portion and the fifth side portion face each other, and the first inductance element included in the first demodulation circuit that outputs the first driving signal obtained by demodulating the first amplified modulated signal and the second inductance element included in the second demodulation circuit that outputs the second driving signal obtained by demodulating the second amplified modulated signal are positioned side by side along the direction in which the second side portion and the fifth side portion face each other. Accordingly, signals having the same frequency and voltage value are propagated side by side along the direction in which the second side portion and the fifth side portion face each other. As a result, the concern that the first reference driving signal, the first modulated signal, the first amplified modulated signal, and the first driving signal interfere with the second reference driving signal, the second modulated signal, the second amplified modulated signal, and the second driving signal interfere is reduced.

What is claimed is:

1. A liquid discharge apparatus comprising:

a first discharge section that discharges a liquid by supplying a first driving signal;

a first integrated circuit that outputs a first modulated signal obtained by modulating a first reference driving signal that is a reference of the first driving signal;

a first amplifier circuit that outputs a first amplified modulated signal by driving a first transistor driven by the first modulated signal;

a first demodulation circuit that includes a first inductance element and outputs the first driving signal obtained by demodulating the first amplified modulated signal;

a second discharge section that discharges the liquid by supplying a second driving signal;

a second integrated circuit that outputs a second modulated signal obtained by modulating a second reference driving signal that is a reference of the second driving signal;

a second amplifier circuit that outputs a second amplified modulated signal by driving a second transistor driven by the second modulated signal; and a second demodulation circuit that includes a second inductance element and outputs the second driving signal obtained by demodulating the second amplified modulated signal, wherein the first inductance element includes a first housing having a first side portion, a second side portion positioned facing the first side portion, and a third side portion intersecting with the first side portion and the second side portion, a first terminal which is provided in the first side portion, and to which the first amplified modulated signal is input, a second terminal which is provided in the second side portion, and from which the first driving signal is output, a first lead member of which one end is coupled to the first terminal and the other end is coupled to the second terminal, and which has a first refraction point and a second refraction point and is provided inside the first housing, and a first guide member provided so as to surround at least a part of the first lead member, in a direction intersecting with a direction from the first side portion toward the second side portion, at least a part of the first lead section positioned between the first refraction point and the second refraction point in the first lead member and a first virtual straight line that connects the first terminal and the second terminal intersect with each other at a first center portion where distances to the first terminal and the second terminal on the first virtual straight line are equal to each other, the second inductance element includes a second housing having a fourth side portion, a fifth side portion positioned facing the fourth side portion, and a sixth side portion intersecting with the fourth side portion and the fifth side portion, a third terminal which is provided in the fourth side portion, and to which the second amplified modulated signal is input, a fourth terminal which is provided in the fifth side portion, and from which the second driving signal is output, a second lead member of which one end is coupled to the third terminal and the other end is coupled to the fourth terminal, and which has a third refraction point and a fourth refraction point and is provided inside the second housing, and a second guide member provided so as to surround at least a part of the second lead member, in a direction intersecting with a direction from the fourth side portion toward the fifth side portion, at least a part of the second lead section positioned between the third refraction point and the fourth refraction point in the second lead member and a second virtual straight line that connects the third terminal and the fourth terminal intersect with each other at a second center portion where distances to the first terminal and the second terminal on the second virtual straight line are equal to each other, and the first inductance element and the second inductance element are positioned such that the second side portion and the fourth side portion face each other.

2. The liquid discharge apparatus according to claim 1, wherein the first refraction point and the second refraction point are positioned in order of the first refraction point and the second refraction point from the first terminal toward the second terminal along the first lead member, the third refraction point and the fourth refraction point are positioned in order of the third refraction point and the fourth refraction point from the third terminal toward the fourth terminal along the second lead member, a shortest distance between the first refraction point and the second terminal is shorter than a shortest distance between the first refraction point and the first terminal, a shortest distance between the second refraction point and the first terminal is shorter than a shortest distance between the second refraction point and the second terminal, a shortest distance between the third refraction point and the fourth terminal is shorter than a shortest distance between the third refraction point and the third terminal, and a shortest distance between the fourth refraction point and the third terminal is shorter than a shortest distance between the fourth refraction point and the fourth terminal.

3. The liquid discharge apparatus according to claim 1, wherein the first inductance element includes a first coil having the first terminal, the first refraction point, and the second refraction point, and a second coil having the second terminal, the first refraction point, and the second refraction point, the second inductance element includes a third coil having the third terminal, the third refraction point, and the fourth refraction point, and a fourth coil having the third terminal, the third refraction point, and the fourth refraction point, when a current flows through the first lead member, a direction of a magnetic field generated in the first coil is different from a direction of a magnetic field generated in the second coil, and when a current flows through the second lead member, a direction of a magnetic field generated in the third coil is different from a direction of a magnetic field generated in the fourth coil.

4. The liquid discharge apparatus according to claim 1, further comprising:

a capacitive element electrically coupled to a propagation path through which a power source voltage supplied to at least one of the first amplifier circuit and the second amplifier circuit propagates, wherein the capacitive element is positioned between the first inductance element and the second inductance element.

5. The liquid discharge apparatus according to claim 1, wherein the first inductance element, the first transistor, and the first integrated circuit are positioned in order of the first inductance element, the first transistor, and the first integrated circuit along a direction intersecting with the third side portion, the second inductance element, the second transistor, and the second integrated circuit are positioned in order of the second inductance element, the second transistor, and the second integrated circuit along a direction intersecting with the sixth side portion, and the first transistor and the second transistor are positioned side by side, and the first integrated circuit and the second integrated circuit are positioned side by side, along a direction in which the second side portion and the fifth side portion face each other.

* * * * *